(12) United States Patent
Nieddu

(10) Patent No.: US 9,765,725 B2
(45) Date of Patent: Sep. 19, 2017

(54) METHOD OF OPERATING AN INTERNAL COMBUSTION ENGINE

(71) Applicant: GM GLOBAL TECHNOLOGY OPERATIONS LLC, Detroit, MI (US)

(72) Inventor: Stefano Nieddu, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 396 days.

(21) Appl. No.: 14/623,921

(22) Filed: Feb. 17, 2015

(65) Prior Publication Data

US 2015/0233318 A1    Aug. 20, 2015

(30) Foreign Application Priority Data

Feb. 19, 2014 (GB) .................................. 1402930.0

(51) Int. Cl.
*F02D 41/38* (2006.01)
*F02D 41/14* (2006.01)
(Continued)

(52) U.S. Cl.
CPC ....... *F02D 41/3809* (2013.01); *F02D 41/123* (2013.01); *F02D 41/1401* (2013.01);
(Continued)

(58) Field of Classification Search
CPC ............... F02D 41/3809; F02D 41/123; F02D 41/1401; F02D 41/3863; F02D 41/401;
(Continued)

(56) References Cited

U.S. PATENT DOCUMENTS 7,027,910 B1 * 4/2006 Javaherian .......... F02D 41/0085
123/406.24
2002/0014224 A1 * 2/2002 Ismailov ................ F02D 41/40
123/494
(Continued)

FOREIGN PATENT DOCUMENTS

DE    WO 2004065775 A1 *  8/2004  ......... F02D 41/3836
WO       2004065775 A1     8/2004
WO       2008007128 A1     1/2008

OTHER PUBLICATIONS

United Kingdom IPO, Great Britain Search Report for GB1402930.0, dated Oct. 6, 2014.

*Primary Examiner* — Stephen K Cronin
*Assistant Examiner* — John Bailey
(74) *Attorney, Agent, or Firm* — Lorenz & Kopf LLP

(57) ABSTRACT

An apparatus and method for controlling a fuel injection system of an internal combustion engine is disclosed. Each fuel injector in the system is operated to perform a predetermined injection pattern per engine cycle. A signal representative of a fuel pressure within the fuel rail during the operation of the fuel injectors is sampled. A Fourier analysis of the fuel rail pressure signal is performed to determine one or more harmonic components thereof. The determined harmonic components of the fuel rail pressure signal are used to calculate a dynamic fuel quantity that flows through a fuel injector during an injection pulse of the injection pattern. A fuel quantity actually injected by the fuel injector during the injection pulse as a function of the dynamic fuel quantity is calculated.

19 Claims, 5 Drawing Sheets

(51) Int. Cl.
   *F02D 41/40*  (2006.01)
   *F02D 41/12*  (2006.01)
   *F02D 41/22*  (2006.01)
   *F02D 41/28*  (2006.01)
   *F02M 63/02*  (2006.01)

(52) U.S. Cl.
   CPC ....... *F02D 41/3863* (2013.01); *F02D 41/401* (2013.01); *F02D 41/402* (2013.01); F02D 2041/1433 (2013.01); F02D 2041/224 (2013.01); F02D 2041/225 (2013.01); F02D 2041/288 (2013.01); F02D 2200/0602 (2013.01); F02D 2200/0606 (2013.01); F02D 2200/0614 (2013.01); F02D 2250/04 (2013.01); F02M 63/0225 (2013.01); Y02T 10/44 (2013.01)

(58) Field of Classification Search
   CPC ........... F02D 41/402; F02D 2041/1433; F02D 2041/224; F02D 2041/225; F02D 2041/288; F02D 2200/0602; F02D 2200/606; F02D 2200/0614; F02D 2250/04; F02M 63/0225; Y02T 10/44
   USPC ......... 701/101, 103, 104; 123/406.3, 406.32, 123/406.45, 406.47, 445, 446, 457, 510, 123/511, 514, 515, 530
   See application file for complete search history.

(56) References Cited

U.S. PATENT DOCUMENTS

| | | | | |
|---|---|---|---|---|
| 2004/0094133 A1* | 5/2004 | Lingenhult | ........ | F02M 25/0809 123/519 |
| 2008/0027585 A1* | 1/2008 | Wesquet | ............ | F02D 41/2096 700/283 |
| 2008/0243401 A1* | 10/2008 | Viele | ....................... | F02D 41/26 702/50 |
| 2009/0178474 A1* | 7/2009 | Bailey | ................ | F02D 19/0628 73/114.38 |
| 2009/0192696 A1* | 7/2009 | De Fazio | ............ | F02D 41/1497 701/103 |
| 2009/0205413 A1* | 8/2009 | Yamauchi | ............ | F02M 65/003 73/114.41 |
| 2009/0306839 A1* | 12/2009 | Youngquist | ............ | G01K 7/021 701/14 |
| 2010/0083640 A1* | 4/2010 | Wang | .................... | F02D 35/026 60/286 |
| 2010/0132435 A1* | 6/2010 | Doring | ................ | F02D 19/0628 73/28.04 |
| 2010/0139254 A1* | 6/2010 | Sebestyen | ............... | F01N 11/00 60/286 |
| 2010/0212295 A1* | 8/2010 | Narayanaswamy | ....................... | F02D 41/0235 60/285 |
| 2011/0185707 A1* | 8/2011 | Upadhyay | ................. | F01N 3/18 60/274 |
| 2011/0224886 A1* | 9/2011 | Wang | ...................... | F02D 19/08 701/103 |
| 2012/0020384 A1* | 1/2012 | Mikami | ............. | F02D 41/3836 374/144 |
| 2013/0024089 A1* | 1/2013 | Wang | .................. | F02D 41/1462 701/102 |
| 2013/0144508 A1* | 6/2013 | Dentici | .................... | F02D 45/00 701/103 |
| 2013/0269317 A1* | 10/2013 | Narayanaswamy | ...... | F01N 3/20 60/274 |
| 2013/0275026 A1* | 10/2013 | Methil-Sudhakaran | ......... | F02M 65/003 701/103 |
| 2013/0291550 A1* | 11/2013 | Weinzierl | .................. | F02C 9/26 60/776 |
| 2013/0327301 A1* | 12/2013 | Brandt | ................ | F02D 41/2096 123/478 |
| 2014/0172280 A1* | 6/2014 | Ogata | .................... | G01H 17/00 701/111 |
| 2014/0224220 A1* | 8/2014 | Moonjelly | ................ | F02D 1/06 123/447 |
| 2014/0229089 A1* | 8/2014 | Jankovic | ................ | F02D 41/30 701/104 |
| 2015/0149063 A1* | 5/2015 | Shah | .................. | F02D 41/0085 701/104 |
| 2015/0159576 A1* | 6/2015 | Surnilla | .................. | F02D 41/3082 701/103 |
| 2016/0177855 A1* | 6/2016 | Kusakabe | ................ | F02D 41/20 123/490 |
| 2016/0237937 A1* | 8/2016 | Kusakabe | ................ | F02D 41/20 |

* cited by examiner

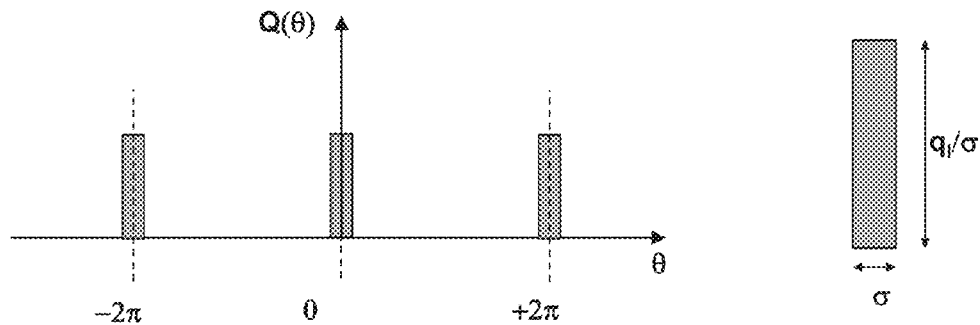
FIG.4                  FIG.5
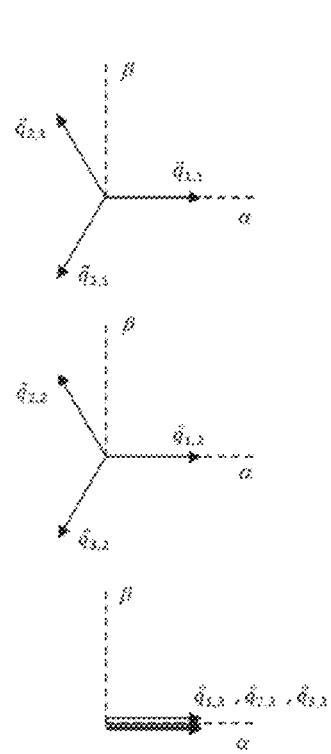
FIG.6
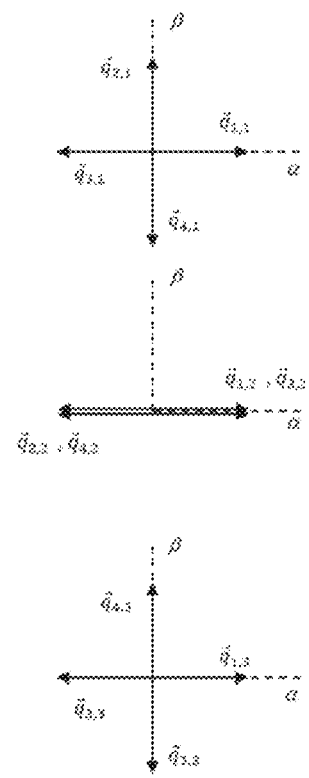
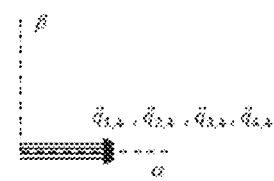
FIG.7

METHOD OF OPERATING AN INTERNAL COMBUSTION ENGINE

CROSS-REFERENCE TO RELATED APPLICATION

This application claims priority to British Patent Application No. GB 1402930.0, filed Feb. 19, 2014, which is incorporated herein by reference in its entirety.

TECHNICAL FIELD

The present disclosure generally relates to a method of operating an internal combustion engines, such as a Diesel engine or a Gasoline engine, and more particularly, to a method of determining the actual fuel quantity that is injected by the engine fuel injectors.

BACKGROUND

It is known that an internal combustion engine generally includes an engine block defining one or more cylinders, each of which accommodates a reciprocating piston coupled to rotate a crankshaft. A cylinder head cooperates with each of the pistons to define a number of combustion chambers, where a fuel and air mixture is injected once per engine cycle and ignited, resulting in hot expanding exhaust gasses that cause reciprocal movement of the pistons. The fuel is provided in each of the combustion chambers by a dedicated fuel injector, which receives the fuel at high pressure from a fuel rail in fluid communication with a high pressure fuel pump that increase the pressure of the fuel received from a fuel source.

Conventionally, each fuel injector provides the fuel into the combustion chamber by performing a plurality of injection pulses per engine cycle, according to a multi-injection pattern. This multi-injection pattern usually includes a main injection, which is generally executed just before the Top Dead Center (TDC) of the piston to generate torque at the crankshaft, and several smaller injections, which may be executed before the main injection (e.g. pilot-injections and pre-injections) and/or after the main injection (e.g. after-injections and post-injections). Each of these small injection pulses is made to inject into the combustion chamber a small quantity of fuel, typically lower than 2.5 mm$^3$ (for example 1 mm$^3$), with the aim of reducing polluting emissions and/or combustion noise of the internal combustion engine.

The fuel injectors are essentially embodied as electromechanical valves having a needle, which is normally biased in a closed position by a spring, and an electro-magnetic actuator (e.g. solenoid), which moves the needle towards an open position in response of an energizing electrical current. The energizing electrical current is provided by an electronic control unit, which is generally configured to determine the fuel quantity to be injected during a single injection pulse, to calculate the duration of the energizing electrical current (i.e. the energizing time) necessary for injecting the desired fuel quantity, and finally to energize the fuel injector accordingly.

However, it may happen that the fuel quantity actually injected during an injection pulse is different from the desired one. This undesirable condition may be caused by several reasons, including drift of the injection characteristics and production spread of the fuel injectors. In particular, the correlation between the electrical command and the injector needle displacement can be effected by factors hard to be controlled during the injectors manufacturing, such as magnetic permeability drift of the actuator, tolerance of the needle spring coefficient, aging effect, and temperature dependency. Therefore, it is very likely that two fuel injectors (even of the same production slot) behave differently in response of the same electrical command.

As a result of all these factors, for a given energizing time at a given fuel rail pressure, the fuel quantity actually injected into the combustion chambers of an internal combustion engine may be different injector-by-injector and/or vary with the aging of the injection system. This problem is particularly critical for the small injection pulses, whose good precision and repetitiveness is essential in order to achieve the expected improvements in terms of polluting emission and combustion noise.

To solve this drawback, when the internal combustion engine running in a cut-off condition, the electronic control unit is configured to perform a learning phase of the actual fuel injected quantity. The learning phase provides for commanding a fuel injector at the time to perform several small injection pulses in a sequence of engine cycles, for detecting in some way the fuel quantity actually injected during these small injection pulses, and then for determining a correction to be applied to the energizing time in order to minimize the difference between the desired and the detected fuel injected quantities. Such learning tests are repeated at predetermined time intervals and performed for each fuel injector of the engine individually.

According to the known solutions, the fuel quantity actually injected may be estimated on the basis of input signals deriving from different kinds of sensors such as knock sensors or on the basis of the crankshaft wheel signal. The major drawback of these prior solutions lies in the fact that such fuel quantity estimations are indirect. Therefore, these signals, for example the crankshaft wheel signal or other signals, are easily effected by noise and other disturbances coming from external environment such as rough roads, electric loads or other external or internal conditions, so that the resulting estimation may be not always reliable. In addition, other objects, desirable features and characteristics will become apparent from the subsequent summary and detailed description, and the appended claims, taken in conjunction with the accompanying drawings and this background.

SUMMARY

In accordance with the present disclosure a strategy for determining the actual quantity of fuel injected by the fuel injectors is provided, which is more reliable and less effected by external disturbances with respect to the known strategies. Thus, the present disclosure provides a rational and rather inexpensive solution.

In this regard, an embodiment of the present disclosure provides a method of operating an internal combustion engine, wherein the internal combustion engine includes a fuel pump, a fuel rail in fluid communication with the fuel pump, and a plurality of fuel injectors in fluid communication with the fuel rail. Each fuel injector is operated to perform a predetermined injection pattern per engine cycle. A signal representative of a fuel pressure is sampled within the fuel rail during the operation of the fuel injectors. A Fourier analysis of the fuel rail pressure signal is performed to determine one or more harmonic components thereof. The determined harmonic components of the fuel rail pressure signal are used to calculate a dynamic fuel quantity that flows through a fuel injector during an injection pulse of the injection pattern. A fuel quantity actually injected by the fuel injector during the injection pulse is calculated as a function of the dynamic fuel quantity.

This solution has the advantage of providing a reliable and effective strategy for determining the actual injected fuel quantity. Another advantage is that the proposed strategy does not requires additional sensors to sample the fuel rail pressure, thereby representing a solution that can be implemented without further costs.

It must be highlighted that for the actual injectors the fuel flow actually injected is composed of a static portion referred to as the static leakage, and two pulse portion referred to as the dynamic leakage and the fuel injected quantity. The static leakage is not monitored with the Fourier analysis, since it doesn't produce any harmonic components in the rail pressure. Conversely, the Fourier analysis advantageously allows to determine the sum of the dynamic leakage and the fuel injected quantity, which may be globally referred as dynamic fuel quantity. Knowing this dynamic fuel quantity is then possible to discern the actual fuel injected quantity using the injector characterization.

According to an aspect of the present disclosure, the fuel rail pressure signal may be sampled in a crankshaft angular domain (i.e. referred to the angular position of the engine crankshaft). The advantage of this aspect is that the determination of the fuel injected quantity becomes independent from the engine speed.

According to another aspect of the present disclosure, the fuel rail pressure signal may be sampled with a sampling frequency that is higher than the frequency of the injection patterns. In this way, since the injection pattern occurrence is generally faster than the fuel rail pressure variation, it is possible to adopt the hypothesis of steady-state or quasi-steady-state conditions.

According to an aspect of the present disclosure, the dynamic fuel quantity may be calculated using the following relation:

$$\vec{P}_k = P_k^\alpha + jP_k^\beta = -\frac{1}{k \cdot C_h} \cdot j\vec{Q}_{rail,k}$$

wherein $\vec{P}_k$ is a vector representative of the kth harmonic order of the fuel rail pressure signal, $P_k^\alpha$ is the real part of the vector $\vec{P}_k$, $P_k^\beta$ is the imaginary part of the vector $\vec{P}_k$, $C_h$ is the hydrodynamic capacitance of the fuel rail, j is the imaginary unit, and $\vec{Q}_{rail,k}$ is a vector representative of the kth harmonic order of the fuel flow rate through the fuel rail. This relation advantageously represents the direct relationship between the harmonic components of the fuel rail pressure and the harmonic components of the fuel flow rate through the fuel rail, which in their turn are directly affected by the dynamic fuel quantity that flow through the fuel injectors.

In particular, the vector $\vec{Q}_{rail,k}$ may be expressed by the following equation:

$$\vec{Q}_{rail,k} = -\vec{Q}_{tot,k}$$

Wherein $\vec{Q}_{tot,k}$ is a vector representative of the kth harmonic order of the fuel flow rate that exits the fuel rail through all the fuel injectors. This relation has the advantage of representing the correlation between the fuel flow rate through the fuel rail and the fuel flow rate through the fuel injectors, when the fuel pump is inactive and/or when the harmonic order k is not equal nor multiple of the number of stroke per engine cycle performed by the fuel pump.

Alternatively, the vector $\vec{Q}_{rail,k}$ may be expressed by the following equation:

$$\vec{Q}_{rail,k} = \vec{Q}_{HP,k} - \vec{Q}_{tot,k}$$

Wherein $\vec{Q}_{tot,k}$ is a vector representative of the kth harmonic order of the fuel flow rate that exits the fuel rail through all the fuel injectors and $\vec{Q}_{HP,k}$ is a vector representative of the kth harmonic order of the fuel flow rate supplied by the fuel pump into the fuel rail. This relation has the advantage of representing the correlation between the fuel flow rate through the fuel rail and the fuel flow rate through the fuel injectors, when the fuel pump is active and the harmonic order k is equal or multiple of the number of stroke per engine cycle performed by the fuel pump.

Taking advantage of these relations, the method of the present disclosure provides that the injection pattern performed by the fuel injectors is composed by a single injection pulse and that the vector $\vec{Q}_{tot,k}$ is expressed by the following equation:

$$\vec{Q}_{tot,k} = \sum_{l=1}^{n} \vec{q}_{l,k} = \sum_{l=1}^{n} \frac{q_l}{\pi} e^{jk2\pi/n \cdot (l-1)}$$

Wherein n is the number of fuel injectors, $\vec{q}_{l,k}$ is a vector representative of the kth harmonic order of the dynamic fuel quantity that flows through the $l^{th}$ fuel injector during the injection pulse, and $q_l$ is the dynamic fuel quantity flowing through the $l^{th}$ fuel injector during the injection pulse.

In this way, replacing this equation in the relations above, it turns out that each harmonic component $\vec{P}_k$ of the fuel rail pressure advantageously provides two equations, which correlate the dynamic fuel quantities $q_l$ flowing through the fuel injectors respectively with the real part $P_k^\alpha$ and the imaginary part $P_k^\beta$ of the harmonic component vector of the fuel rail pressure. Among all these equations it is possible to select a number of equations equal to the number n of fuel injectors and finally to resolve the system of these equations to calculate the dynamic fuel quantity $q_l$ flowing through each fuel injector, and then the actual fuel injected quantity.

This embodiment of the present disclosure may generally be used as a test aimed to check the efficiency of the fuel injectors, or as part of a closed loop control of the fuel injected quantity, for example in order to adjust the energizing time such as to inject exactly a desired quantity of fuel.

According to another embodiment of the method, the injection pattern performed by the fuel injectors may be composed by a plurality of equal injection pulses and the vector $\vec{Q}_{tot,k}$ may be expressed by the following equation:

$$\vec{Q}_{tot,k} = \sum_{l=1}^{n} \vec{q}_{l,k} = \sum_{l=1}^{n} \left[ \frac{q_{ls}}{\pi} e^{jk2\pi/n \cdot (l-1)} \sum_{i=1}^{m} \cos\left(k\frac{(2i-m-1)}{2}\delta\right) \right]$$

wherein n is the number of fuel injectors, $\vec{q}_{l,k}$ is a vector representative of the kth harmonic order of the dynamic fuel quantity that flows through the $l^{th}$ fuel injector during each injection pattern, $q_{ls}$ is the dynamic fuel quantity flowing through the $l^{th}$ fuel injector during each injection pulse, m is the number of injection pulses in the injection pattern and $\delta$ is the angular shift from each injection pulse to another.

In this way, replacing this equation in the relations above, it turns out that each harmonic component $\vec{P}_k$ of the fuel rail pressure advantageously provides two equations, which correlate the dynamic fuel quantities $q_{ls}$ flowing through the fuel injectors respectively with the real part $P_k^\alpha$ and the imaginary part $P_k^\beta$ of the harmonic component vector of the fuel rail pressure. Among all these equations it is still possible to select a number of equations equal to the number n of fuel injectors and finally to resolve the system of these equations to calculate the dynamic fuel quantity $q_{ls}$ flowing through each fuel injector, and then the actual fuel injected quantity.

This embodiment of the present disclosure may be performed when the internal combustion engine is running under cut-off condition, and may be used in a closed loop control of the fuel injected quantity, for example in order to determine the energizing time actually needed to inject exactly a desired quantity of fuel. In particular, this embodiment of the present disclosure may be useful when the fuel quantities $q_{ls}$ belongs to the so called small injections. Indeed, repeating these small injection pulses more than once per engine cycle, it is advantageously possible to enhance their effect of the fuel rail pressure, which therefore may be measured more easily.

According to another embodiment of the method, the injection pattern performed by the fuel injectors may be composed by a main injection pulse and one or more auxiliary injection pulses, wherein the auxiliary injection pulses are smaller than the main injection pulse, and the vector $\vec{Q}_{tot,k}$ may be expressed by the following equation:

$$\vec{Q}_{tot,k} = \sum_{l=1}^{n} \vec{q}_{l,k} =$$

$$\sum_{l=1}^{n} \left[ q_{lm} + \sum_{r=1}^{x} q_{lr} \cos(k\delta_{lr}) \right] e^{jk2\pi/n \cdot (l-1)} - j \left[ \sum_{r=1}^{x} q_{lr} \sin(k\delta_{lr}) \right] e^{jk2\pi/n \cdot (l-1)}$$

wherein n is the number of fuel injectors, $\vec{q}_{l,k}$ is a vector representative of the kth harmonic order of the dynamic fuel quantity that flows through the $l^{th}$ fuel injector during each injection pattern, $q_{lm}$ is the dynamic fuel quantity flowing through the $l^{th}$ fuel injector during the main injection pulse, x is the number of auxiliary injection pulses in the injection pattern, $q_{lr}$ is the dynamic fuel quantity flowing through the lth fuel injector during the $r^{th}$ auxiliary injection pulse, and $\delta_{lr}$ is the angular shift from the $r^{th}$ auxiliary injection pulse and the main injection pulse performed by the lth fuel injector.

In this way, replacing this equation in the relations above, it turns out that each harmonic component $\vec{P}_k$ of the fuel rail pressure advantageously provides two equations, which correlate the dynamic fuel quantities $q_{lm}$ and $q_{lr}$ flowing through the fuel injectors respectively with the real part $P_k^\alpha$ and the imaginary part $P_k^\beta$ of the harmonic component vector of the fuel rail pressure. Assuming that the fuel quantities $q_{lr}$ are known, these equations actually correlates the harmonic components of the rail pressure with the dynamic fuel quantities $q_{lm}$ of the main injection pulses. Among all these equations, it is still possible to select a number of equations equal to the number n of fuel injectors and finally to resolve the system of these equations to calculate the dynamic fuel quantity $q_{lm}$ flowing through each fuel injector, and then the actual fuel injected quantity.

This embodiment of the present disclosure may be performed during the normal operation of the engine, in order to monitor the fuel quantities that are actually injected by the main injections. This fuel injected quantity may particularly be used in a closed loop control of the fuel injected quantity, for example in order to adjust the energizing time of the main injections such as to inject exactly a desired quantity of fuel.

The method according to all the embodiments of the present disclosure can be carried out with the help of a computer program including a program-code for carrying out all the steps of the method described above, and in the form of a computer program product including the computer program. The method can be also embodied as an electromagnetic signal modulated to carry a sequence of data bits which represent a computer program to carry out all steps of the method.

Another embodiment of the present disclosure provides an internal combustion engine including a fuel pump, a fuel rail in fluid communication with the fuel pump, a plurality of fuel injectors in fluid communication with the fuel rail, and an electronic control unit. The electronic control module is configured to operate each fuel injector to perform a predetermined injection pattern per engine cycle, sample a signal representative of a fuel pressure within the fuel rail during the operation of the fuel injectors, perform a Fourier analysis of the fuel rail pressure signal to determine one or more harmonic components thereof, use the determined harmonic components of the fuel rail pressure signal to calculate a dynamic fuel quantity that flows through a fuel injector during an injection pulse of the injection pattern, and calculate a fuel quantity actually injected by the fuel injector during the injection pulse as a function of the dynamic fuel quantity.

This embodiment of the present disclosure achieves basically the same advantages explained with reference to the internal combustion engine above, in particular that of providing a reliable strategy for determining the actual injected fuel quantity by the fuel injectors and without additional sensors.

According to an aspect of the present disclosure, the electronic control unit may be configured to sample the fuel rail pressure signal in a crankshaft angular domain (i.e. referred to the angular position of the engine crankshaft). The advantage of this aspect is that the determination of the fuel injected quantity becomes independent from the engine speed.

According to another aspect of the present disclosure, the electronic control unit may be configured to sample the fuel rail pressure signal with a sampling frequency that is higher than the frequency of the injection patterns. In this way, since the injection pattern occurrence is generally faster than the fuel rail pressure variation, it is possible to adopt the hypothesis of steady-state or quasi-steady-state conditions.

According to an aspect of the present disclosure, the electronic control unit may be configured to calculate the dynamic fuel quantity using the following relation:

$$\vec{P}_k = P_k^\alpha + jP_k^\beta = -\frac{1}{k \cdot C_h} \cdot j\vec{Q}_{rail,k}$$

wherein $\vec{P}_k$ is a vector representative of the kth harmonic order of the fuel rail pressure signal, $P_k^\alpha$ is the real part of the vector $\vec{P}_k$, $P_k^\beta$ is the imaginary part of the vector $\vec{P}_k$, Ch is the hydrodynamic capacitance of the fuel rail, j is the imaginary unit, and $\vec{Q}_{rail,k}$ is a vector representative of the kth harmonic order of the fuel flow rate through the fuel rail. This relation advantageously represents the direct relationship between the harmonic components of the fuel rail pressure and the harmonic components of the fuel flow rate through the fuel rail, which in their turn are directly affected by the dynamic fuel quantity that flow through the fuel injectors.

In particular, the vector $\vec{Q}_{rail,k}$ may be expressed by the following equation:

$$\vec{Q}_{rail,k} = -\vec{Q}_{tot,k}$$

Wherein $\vec{Q}_{tot,k}$ is a vector representative of the kth harmonic order of the fuel flow rate that exits the fuel rail through all the fuel injectors. This relation has the advantage of representing the correlation between the fuel flow rate through the fuel rail and the fuel flow rate through the fuel injectors, when the fuel pump is inactive and/or when the harmonic order k is not equal nor multiple of the number of stroke per engine cycle performed by the fuel pump.

Alternatively, the vector $\vec{Q}_{rail,k}$ may be expressed by the following equation:

$$\vec{Q}_{rail,k} = \vec{Q}_{HP,k} - \vec{Q}_{tot,k}$$

Wherein $\vec{Q}_{tot,k}$ is a vector representative of the kth harmonic order of the fuel flow rate that exits the fuel rail through all the fuel injectors and $\vec{Q}_{HP,k}$ is a vector representative of the $k^{th}$ harmonic order of the fuel flow rate supplied by the fuel pump into the fuel rail. This relation has the advantage of representing the correlation between the fuel flow rate through the fuel rail and the fuel flow rate through the fuel injectors, when the fuel pump is active and the harmonic order k is equal or multiple of the number of stroke per engine cycle performed by the fuel pump.

Taking advantage of these relations, an embodiment of the present disclosure may provide that the injection pattern performed by the fuel injectors is composed by a single injection pulse and that the vector $\vec{Q}_{tot,k}$ is expressed by the following equation:

$$\vec{Q}_{tot,k} = \sum_{l=1}^{n} \vec{q}_{l,k} = \sum_{l=1}^{n} \frac{q_l}{\pi} e^{jk2\pi/n \cdot (l-1)}$$

Wherein n is the number of fuel injectors, $\vec{q}_{l,k}$ is a vector representative of the $k^{th}$ harmonic order of the dynamic fuel quantity that flows through the $l^{th}$ fuel injector during the injection pulse, and $q_l$ is the dynamic fuel quantity flowing through the $l^{th}$ fuel injector during the injection pulse.

In this way, replacing this equation in the relations above, it turns out that each harmonic component $\vec{P}_k$ of the fuel rail pressure advantageously provides two equations, which correlate the dynamic fuel quantities $q_l$ flowing through the fuel injectors respectively with the real part $P_k^\alpha$ and the imaginary part $P_k^\beta$ of the harmonic component vector of the fuel rail pressure. Among all these equations it is possible to select a number of equations equal to the number n of fuel injectors and finally to resolve the system of these equations to calculate the dynamic fuel quantity $q_l$ flowing through each fuel injector, and then the actual fuel injected quantity. This embodiment of the present disclosure may generally be used as a test aimed to check the efficiency of the fuel injectors, or as part of a closed loop control of the fuel injected quantity, for example in order to adjust the energizing time such as to inject exactly a desired quantity of fuel.

According to another embodiment of the present disclosure, the injection pattern performed by the fuel injectors may be composed by a plurality of equal injection pulses and the vector $\vec{Q}_{tot,k}$ may be expressed by the following equation:

$$\vec{Q}_{tot,k} = \sum_{l=1}^{n} \vec{q}_{l,k} = \sum_{l=1}^{n} \left[ \frac{q_{ls}}{\pi} e^{jk2\pi/n \cdot (l-1)} \sum_{i=1}^{m} \cos\left(k \frac{(2i-m-1)}{2} \delta\right) \right]$$

wherein n is the number of fuel injectors, $\vec{q}_{l,k}$ is a vector representative of the $k^{th}$ harmonic order of the dynamic fuel quantity that flows through the lth fuel injector during each injection pattern, $q_{ls}$ is the dynamic fuel quantity flowing through the $l^{th}$ fuel injector during each injection pulse, m is the number of injection pulses in the injection pattern and δ is the angular shift from each injection pulse to another.

In this way, replacing this equation in the relations above, it turns out that each harmonic component $\vec{P}_k$ of the fuel rail pressure advantageously provides two equations, which correlate the dynamic fuel quantities qls flowing through the fuel injectors respectively with the real part $P_k^\alpha$ and the imaginary part $P_k^\beta$ of the harmonic component vector of the fuel rail pressure. Among all these equations it is still possible to select a number of equations equal to the number n of fuel injectors and finally to resolve the system of these equations to calculate the dynamic fuel quantity $q_{ls}$ flowing through each fuel injector, and then the actual fuel injected quantity.

This embodiment of the present disclosure may be performed when the internal combustion engine is running under cut-off condition, and may be used in a closed loop control of the fuel injected quantity, for example in order to determine the energizing time actually needed to inject exactly a desired quantity of fuel. In particular, this embodiment of the present disclosure may be useful when the fuel quantities $q_{ls}$ belongs to the so called small injections. Indeed, repeating these small injection pulses more than once per engine cycle, it is advantageously possible to enhance their effect of the fuel rail pressure, which therefore may be measured more easily.

According to another embodiment of the present disclosure, the injection pattern performed by the fuel injectors may be composed by a main injection pulse and one or more auxiliary injection pulses, wherein the auxiliary injection pulses are smaller than the main injection pulse, and the vector $\vec{Q}_{tot,k}$ may be expressed by the following equation:

$$\vec{Q}_{tot,k} = \sum_{l=1}^{n} \vec{q}_{lk} =$$

$$\sum_{l=1}^{n} \left[ q_{lm} + \sum_{r=1}^{x} q_{lr} \cos(k\delta_{lr}) \right] e^{jk2\pi/n \cdot (l-1)} - j \left[ \sum_{r=1}^{x} q_{lr} \sin(k\delta_{lr}) \right] e^{jk2\pi/n \cdot (l-1)}$$

wherein n is the number of fuel injectors, $\vec{q}_{l,k}$ is a vector representative of the $k^{th}$ harmonic order of the dynamic fuel quantity that flows through the $l^{th}$ fuel injector during each injection pattern, $q_{lm}$ is the dynamic fuel quantity flowing through the $l^{th}$ fuel injector during the main injection pulse, x is the number of auxiliary injection pulses in the injection pattern, $q_{lr}$ is the dynamic fuel quantity flowing through the $l^{th}$ fuel injector during the $r^{th}$ auxiliary injection pulse, and $\delta_{lr}$ is the angular shift from the $r^{th}$ auxiliary injection pulse and the main injection pulse performed by the lth fuel injector.

In this way, replacing this equation in the relations above, it turns out that each harmonic component $\vec{P}_k$ of the fuel rail pressure advantageously provides two equations, which correlate the dynamic fuel quantities $q_{lm}$ and $q_{lr}$ flowing through the fuel injectors respectively with the real part $P_k^\alpha$ and the imaginary part $P_k^\beta$ of the harmonic component vector of the fuel rail pressure. Assuming that the fuel quantities $q_{lr}$ are known, these equations actually correlates the harmonic components of the rail pressure with the dynamic fuel quantities $q_{lm}$ of the main injection pulses. Among all these equations, it is still possible to select a number of equations equal to the number n of fuel injectors and finally to resolve the system of these equations to calculate the dynamic fuel quantity $q_{lm}$ flowing through each fuel injector, and then the actual fuel injected quantity.

This embodiment of the present disclosure may be performed during the normal operation of the engine, in order to monitor the fuel quantities that are actually injected by the main injections. This fuel injected quantity may particularly be used in a closed loop control of the fuel injected quantity, for example in order to adjust the energizing time of the main injections such as to inject exactly a desired quantity of fuel.

Another embodiment of the present disclosure provides an apparatus for operating an internal combustion engine, wherein the internal combustion engine includes a fuel pump, a fuel rail in fluid communication with the fuel pump, and a plurality of fuel injectors in fluid communication with the fuel rail, and wherein the apparatus includes means for operating each fuel injector to perform a predetermined injection pattern per engine cycle, means for sampling a signal representative of a fuel pressure within the fuel rail during the operation of the fuel injectors, means for performing a Fourier analysis of the fuel rail pressure signal to determine one or more harmonic components thereof, means for using the determined harmonic components of the fuel rail pressure signal to calculate a dynamic fuel quantity that flows through a fuel injector during an injection pulse of the injection pattern, and means for calculating a fuel quantity actually injected by the fuel injector during the injection pulse as a function of the dynamic fuel quantity.

This embodiment of the present disclosure achieves basically the same advantages are explained with reference to the method above, in particular that of providing a reliable strategy for determining the actual injected fuel quantity by the fuel injectors and without additional sensors.

According to an aspect of the present disclosure, means for sampling may be configured to sample the fuel rail pressure signal in a crankshaft angular domain (i.e. referred to the angular position of the engine crankshaft). The advantage of this aspect is that the determination of the fuel injected quantity becomes independent from the engine speed.

According to another aspect of the present disclosure, means for sampling may be configured to sample the fuel rail pressure signal with a sampling frequency that is higher than the frequency of the injection patterns. In this way, since the injection pattern occurrence is generally faster than the fuel rail pressure variation, it is possible to adopt the hypothesis of steady-state or quasi-steady-state conditions.

According to an aspect of the present disclosure, means for calculating the dynamic fuel quantity may be configured to use the following relation:

$$\vec{P}_k = P_k^\alpha + jP_k^\beta = -\frac{1}{k \cdot C_h} \cdot j\vec{Q}_{rail,k}$$

wherein $\vec{P}_k$ is a vector representative of the $k^{th}$ harmonic order of the fuel rail pressure signal, $P_k^\alpha$ is the real part of the vector $\vec{P}_k$, $P_k^\beta$ is the imaginary part of the vector $\vec{P}_k$, $C_h$ is the hydrodynamic capacitance of the fuel rail, j is the imaginary unit, and $\vec{Q}_{rail,k}$ is a vector representative of the $k^{th}$ harmonic order of the fuel flow rate through the fuel rail. This relation advantageously represents the direct relationship between the harmonic components of the fuel rail pressure and the harmonic components of the fuel flow rate through the fuel rail, which in their turn are directly affected by the dynamic fuel quantity that flow through the fuel injectors.

In particular, the vector $\vec{Q}_{rail,k}$ may be expressed by the following equation:

$$\vec{Q}_{rail,k} = -\vec{Q}_{tot,k}$$

Wherein $\vec{Q}_{tot,k}$ is a vector representative of the $k^{th}$ harmonic order of the fuel flow rate that exits the fuel rail through all the fuel injectors. This relation has the advantage of representing the correlation between the fuel flow rate through the fuel rail and the fuel flow rate through the fuel injectors, when the fuel pump is inactive and/or when the harmonic order k is not equal nor multiple of the number of stroke per engine cycle performed by the fuel pump.

Alternatively, the vector $\vec{Q}_{rail,k}$ may be expressed by the following equation:

$$\vec{Q}_{rail,k} = \vec{Q}_{HP,k} - \vec{Q}_{tot,k}$$

Wherein $\vec{Q}_{tot,k}$ is a vector representative of the kth harmonic order of the fuel flow rate that exits the fuel rail through all the fuel injectors and $\vec{Q}_{HP,k}$ is a vector representative of the kth harmonic order of the fuel flow rate supplied by the fuel pump into the fuel rail.

This relation has the advantage of representing the correlation between the fuel flow rate through the fuel rail and the fuel flow rate through the fuel injectors, when the fuel pump is active and the harmonic order k is equal or multiple of the number of stroke per engine cycle performed by the fuel pump.

Taking advantage of these relations, the apparatus of the present disclosure may provide that the injection pattern performed by the fuel injectors is composed by a single injection pulse and that the vector $\vec{Q}_{tot,k}$ is expressed by the following equation:

$$\vec{Q}_{tot,k} = \sum_{l=1}^{n} \vec{q}_{l,k} = \sum_{l=1}^{n} \frac{q_l}{\pi} e^{jk2\pi/n \cdot (l-1)}$$

Wherein n is the number of fuel injectors, $\vec{q}_{l,k}$ is a vector representative of the $k^{th}$ harmonic order of the dynamic fuel quantity that flows through the $l^{th}$ fuel injector during the injection pulse, and $q_l$ is the dynamic fuel quantity flowing through the lth fuel injector during the injection pulse.

In this way, replacing this equation in the relations above, it turns out that each harmonic component $\vec{P}_k$ of the fuel rail pressure advantageously provides two equations, which correlate the dynamic fuel quantities $q_l$ flowing through the fuel injectors respectively with the real part $P_k^\alpha$ and the imaginary part $P_k^\beta$ of the harmonic component vector of the fuel rail pressure. Among all these equations it is possible to select a number of equations equal to the number n of fuel injectors and finally to resolve the system of these equations to calculate the dynamic fuel quantity $q_l$ flowing through each fuel injector, and then the actual fuel injected quantity.

This embodiment of the present disclosure may generally be used as a test aimed to check the efficiency of the fuel injectors, or as part of a closed loop control of the fuel injected quantity, for example in order to adjust the energizing time such as to inject exactly a desired quantity of fuel.

According to another embodiment of the apparatus, the injection pattern performed by the fuel injectors may be composed by a plurality of equal injection pulses and the vector $\vec{Q}_{tot,k}$ may be expressed by the following equation:

$$\vec{Q}_{tot,k} = \sum_{l=1}^{n} \vec{q}_{l,k} = \sum_{l=1}^{n} \frac{q_{ls}}{\pi} e^{jk2\pi/n \cdot (l-1)} \sum_{i=1}^{m} \cos\left(k\frac{(2i-m-1)}{2}\delta\right)$$

wherein n is the number of fuel injectors, $\vec{q}_{l,k}$ is a vector representative of the $k^{th}$ harmonic order of the dynamic fuel quantity that flows through the $l^{th}$ fuel injector during each injection pattern, $q_{ls}$ is the dynamic fuel quantity flowing through the $l^{th}$ fuel injector during each injection pulse, m is the number of injection pulses in the injection pattern and $\delta$ is the angular shift from each injection pulse to another.

In this way, replacing this equation in the relations above, it turns out that each harmonic component $\vec{P}_k$ of the fuel rail pressure advantageously provides two equations, which correlate the dynamic fuel quantities $q_{ls}$ flowing through the fuel injectors respectively with the real part $P_k^\alpha$ and the imaginary part $P_k^\beta$ of the harmonic component vector of the fuel rail pressure. Among all these equations it is still possible to select a number of equations equal to the number n of fuel injectors and finally to resolve the system of these equations to calculate the dynamic fuel quantity $q_{ls}$ flowing through each fuel injector, and then the actual fuel injected quantity.

This embodiment of the present disclosure may be performed when the internal combustion engine is running under cut-off condition, and may be used in a closed loop control of the fuel injected quantity, for example in order to determine the energizing time actually needed to inject exactly a desired quantity of fuel. In particular, this embodiment of the present disclosure may be useful when the fuel quantities $q_{ls}$ belongs to the so called small injections.

Indeed, repeating these small injection pulses more than once per engine cycle, it is advantageously possible to enhance their effect of the fuel rail pressure, which therefore may be measured more easily.

According to another embodiment of the apparatus, the injection pattern performed by the fuel injectors may be composed by a main injection pulse and one or more auxiliary injection pulses, wherein the auxiliary injection pulses are smaller than the main injection pulse, and the vector $\vec{Q}_{tot,k}$ may be expressed by the following equation:

$$\vec{Q}_{tot,k} = \sum_{l=1}^{n} \vec{q}_{l,k} =$$
$$\sum_{l=1}^{n} \left[q_{lm} + \sum_{r=1}^{x} q_{lr}\cos(k\delta_{lr})\right] e^{jk2\pi/n \cdot (l-1)} - j\left[\sum_{r=1}^{x} q_{lr}\sin(k\delta_{lr})\right] e^{jk2\pi/n \cdot (l-1)}$$

wherein n is the number of fuel injectors, $\vec{q}_{l,k}$ is a vector representative of the $k^{th}$ harmonic order of the dynamic fuel quantity that flows through the $l^{th}$ fuel injector during each injection pattern, $q_{lm}$ is the dynamic fuel quantity flowing through the $l^{th}$ fuel injector during the main injection pulse, x is the number of auxiliary injection pulses in the injection pattern, $q_{lr}$ is the dynamic fuel quantity flowing through the $l_{th}$ fuel injector during the $r_{th}$ auxiliary injection pulse, and $\delta_{lr}$ is the angular shift from the $r_{th}$ auxiliary injection pulse and the main injection pulse performed by the lth fuel injector.

By replacing this equation in the relations above, it turns out that each harmonic component $\vec{P}_k$ of the fuel rail pressure advantageously provides two equations, which correlate the dynamic fuel quantities $q_{lm}$ and $q_{lr}$ flowing through the fuel injectors respectively with the real part $P_k^\alpha$ and the imaginary part $P_k^\beta$ of the harmonic component vector of the fuel rail pressure. Assuming that the fuel quantities $q_{lr}$ are known, these equations actually correlates the harmonic components of the rail pressure with the dynamic fuel quantities $q_{lm}$ of the main injection pulses. Among all these equations, it is still possible to select a number of equations equal to the number n of fuel injectors and finally to resolve the system of these equations to calculate the dynamic fuel quantity $q_{lm}$ flowing through each fuel injector, and then the actual fuel injected quantity.

This embodiment of the present disclosure may be performed during the normal operation of the engine, in order to monitor the fuel quantities that are actually injected by the main injections. This fuel injected quantity may particularly be used in a closed loop control of the fuel injected quantity, for example in order to adjust the energizing time of the main injections such as to inject exactly a desired quantity of fuel.

BRIEF DESCRIPTION OF THE DRAWINGS

The present disclosure will hereinafter be described in conjunction with the following drawing figures, wherein like numerals denote like elements.

FIG. 4 is a diagram that represents a sequence of periodic injection pulses performed by a fuel injector in the angular domain;

FIG. 5 represents a single injection pulse;

FIG. 6 is a vector representation of the injection harmonic orders of the injection pulses in a 3-cylinder engine, wherein each fuel injector perform a sequence of injection pulses as shown in FIG. 5;

FIG. 7 is a vector representation of the injection harmonic orders of the injection pulses in a 4-cylinder engine, wherein each fuel injector perform a sequence of injection pulses as shown in FIG. 5;

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

Figure 1:
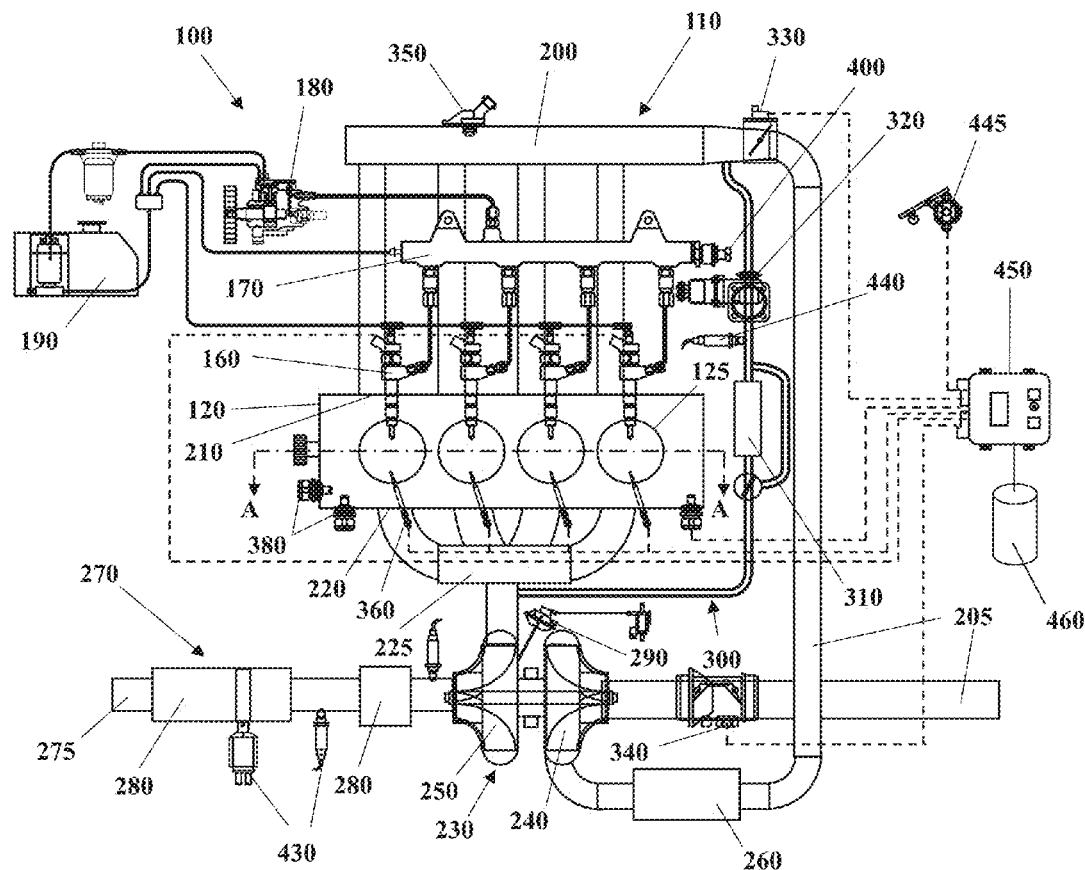
FIG. 1 schematically shows an automotive system.
Figure 2:
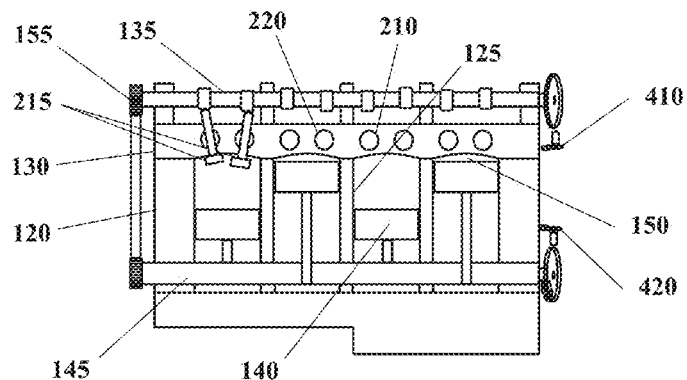
FIG. 2 is the section A-A of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 per combustion chamber and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after treatment devices 280. The after treatment devices may be any device configured to change the composition of the exhaust gases. Some examples of after treatment devices 280 include, but are not limited to, catalytic converters (two and three way), oxidation catalysts, lean NOx traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
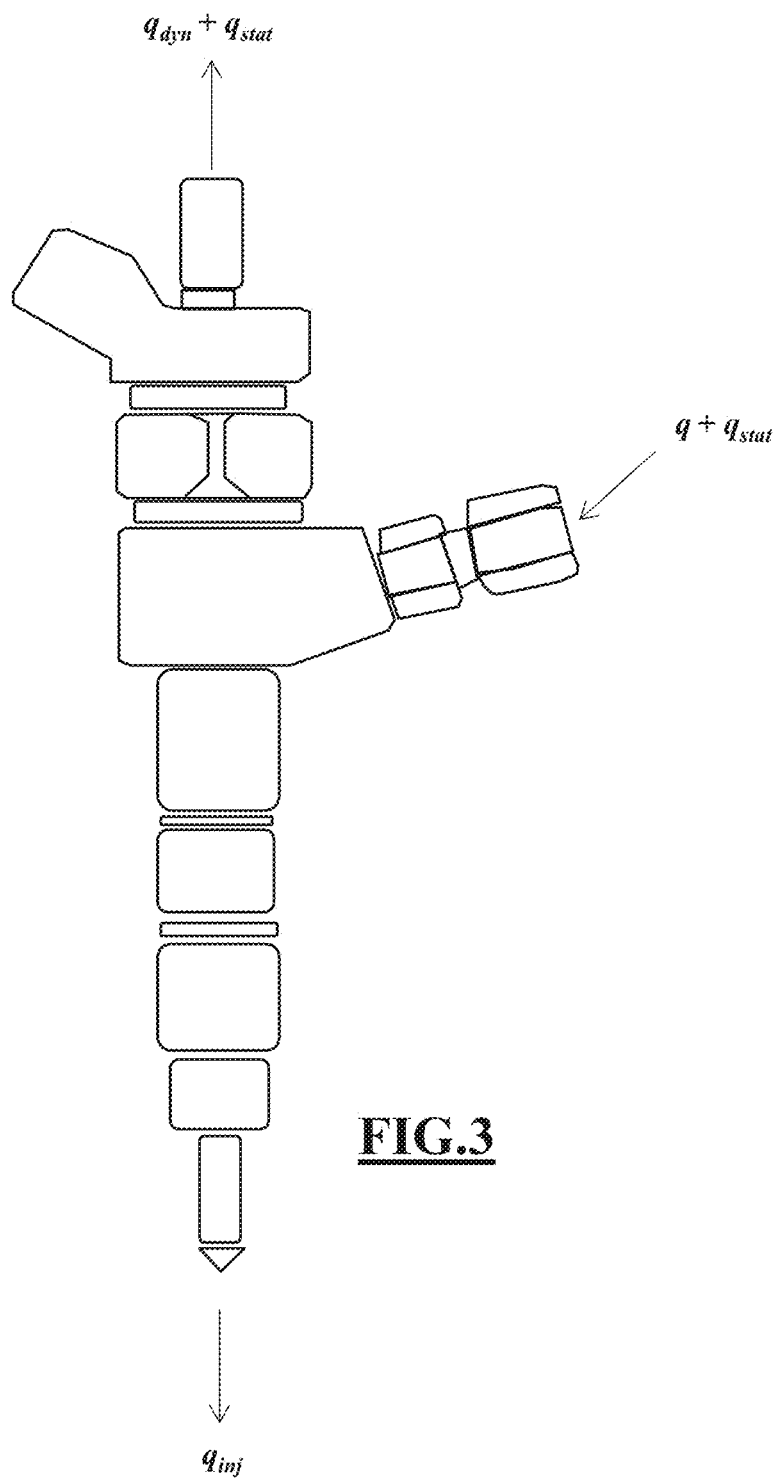
FIG. 3 shows in greater details a fuel injector of the automotive system of FIG. 1.

The ECU 450 is, in part, tasked with operating the fuel injectors 160. As shown in FIG. 3, each of the fuel injectors 160 is generally embodied as an electromechanical valve having a nozzle 161 in fluid communication with the corresponding combustion chamber 150, a needle 162, which is normally biased by a spring 163 in a closed position of the nozzle 161, and an electro-magnetic actuator 164 (e.g. solenoid), which moves the needle 162 towards an open position of the nozzle 161 in response of an energizing electrical current. In this way, any time the electro-magnetic actuator 164 is provided with the energizing electrical current (also named electrical command), a direct connection is opened between the fuel rail 170 and the cylinder 125, which let a certain quantity of fuel to be injected into the combustion chamber 150. Any one of these events is conventionally called as injection pulse.

During normal operation, the ECU 450 generally commands each fuel injector to perform a plurality of injection pulses per engine cycle, according to a multi-injection pattern. The fuel quantity injected into the combustion chamber 150 by each single injection pulse generally depends on the pressure of the fuel in the fuel rail 170 and on the needle displacement, which is correlated with the duration of the electrical command (i.e. energizing time ET). Therefore, the ECU 450 is generally configured to determine the fuel quantity to be injected with each single injection pulse, to calculate the energizing time necessary for injecting the desired fuel quantity, and finally to energize the fuel injector 160 accordingly. However, the quantity of fuel actually injected by the fuel injector 160 may sometimes be different with respect to the desired one, due to aging effect and/or production spread of the fuel injector 160.

For this reason, the ECU 450 may be configured to perform from time to time a detecting strategy to determine the real quantity of fuel that is actually injected by each of the fuel injector 160 for a given energizing time, for example in order to diagnose the efficiency of the injection system and/or to be able to correct the energizing time with the aim of injecting exactly a desired fuel quantity.

In this regard, it must be highlighted that the fuel quantity that actually flows through the fuel injector 160 is composed by a static part, namely the static leakage $q_{stat}$, and two dynamic parts, namely the fuel injected quantity $q_{inj}$ and the dynamic leakage $q_{dyn}$. The fuel injected quantity $q_{inj}$ and the dynamic leakage $q_{dyn}$ occurs only when an injection pulse is performed. More precisely, the fuel injected quantity $q_{inj}$ is the quantity of fuel that actually enters the combustion chamber 150, whereas dynamic leakage $q_{dyn}$ is a quantity of fuel that, when the injector needle 162 is moved in the open position, flows through a backflow outlet of the fuel injector 160 and returns into the fuel source 190. As a consequence, the dynamic fuel quantity q that globally flows through the fuel injector 160 during an injection pulse (in addition to the static leakage $q_{stat}$) may be considered as the sum of the fuel injected quantity $q_{inj}$ and the dynamic leakage $q_{dyn}$:

$$q = q_{inj} + q_{dyn}$$

However, both $q_{inj}$ and $q_{dyn}$ depend only on the fuel pressure at the inlet of the fuel injector 160, namely the fuel rail pressure P, and on the needle displacement during the injection pulse, which is strictly related to the overall dynamic fuel quantity q. Therefore, for each kind of fuel injector 160, it is possible to determine (for example with an experimental activity) two correlation functions $f_{inj}$ and $f_{dyn}$ that correlates the above mentioned parameters:

$$q_{inj} = f_{inj}(P, q) \qquad (1)$$

$$q_{dyn} = f_{dyn}(P, q) \qquad (2)$$

As a consequence, knowing the fuel rail pressure P and the dynamic fuel quantity q, it will be always possible to calculate the actual fuel injected quantity $q_{inj}$ with the equation (1) above.

Figure 12:
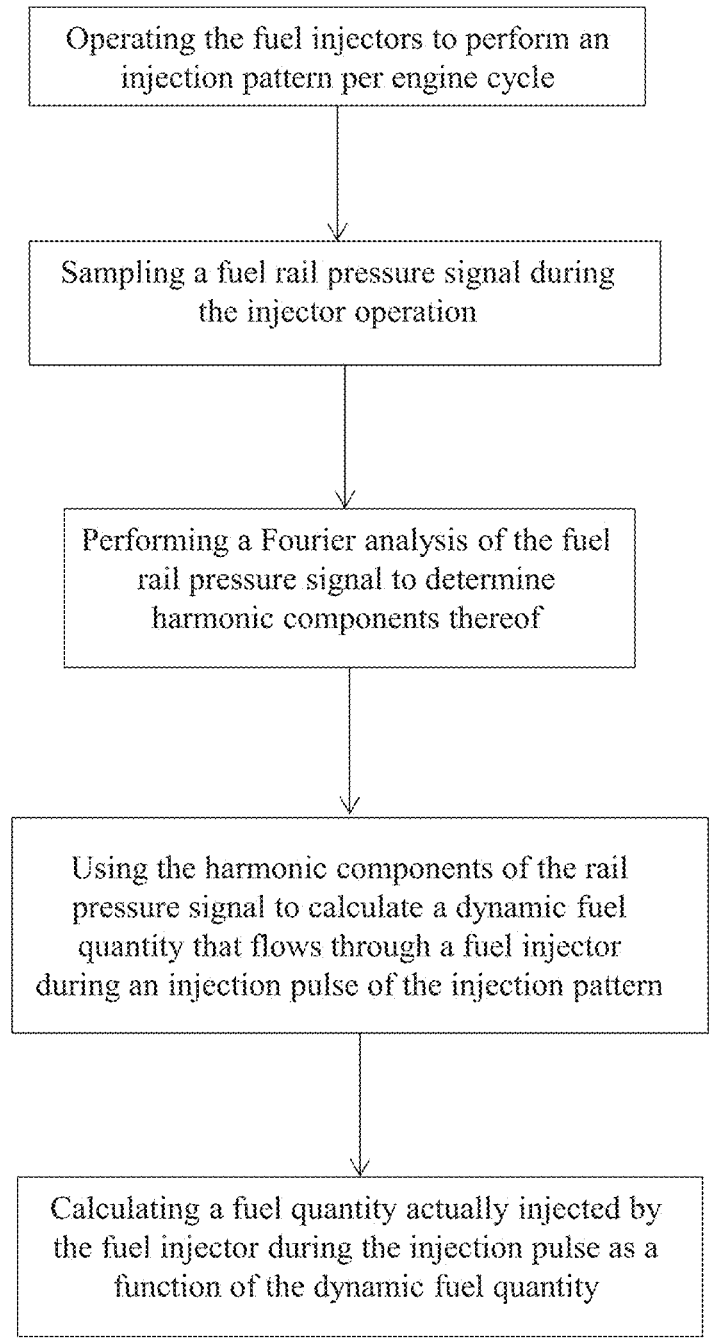
FIG. 12 is a flowchart representing a method according to an embodiment of the present disclosure.

Since the injection pulses are impulsive events, they produce harmonic components in the fuel pressure within the fuel rail 170, which depend on the dynamic fuel quantity q but not on the static leakage $q_{stat}$. For this reason, the detecting strategy (see FIG. 12) may generally provide for the ECU 450 to operate each fuel injector 160 to perform a predetermined injection pattern per engine cycle; to sample a signal representative of a fuel rail pressure during the operation of the fuel injectors 160; to perform a spectral analysis in real time of the fuel rail pressure signal by the application of the Fourier transform, thereby determining one or more harmonic components thereof; to use the determined harmonic components of the fuel rail pressure signal to calculate a dynamic fuel quantity q that flows through a fuel injector 160 during an injection pulse of the injection pattern; and finally to calculate a fuel quantity $q_{inj}$ actually injected by the fuel injector 160 during the injection pulse as a function of the dynamic fuel quantity.

The fuel rail pressure signal may be an electric signal coming from the fuel rail pressure sensor 400. The signal may be sampled in the angular domain (i.e. referred to the crankshaft angular position), in order to make it independent from the engine speed. Additionally, the signal may be sampled at a high sampling rate, for example pressure signal with a sampling frequency that is higher than the frequency of the injection patterns. In this way, since the injection pattern occurrence is generally faster than the fuel rail pressure variation, it is possible to adopt the hypothesis of steady-state or quasi-steady-state conditions.

In greater detail, the detecting strategy may provide for the ECU 450 to operate all the fuel injectors 160 of the internal combustion engine 110 such that each of them performs a injection pattern constituted by a single (i.e. only one) injection pulse (see. FIG. 4). As a matter of fact, each one of the fuel injectors 160 performs a sequence of injection pulses with an angular periodicity of 2π (referred to the crankshaft rotation), and the injection pulses performed by all the fuel injectors 160 result symmetrically distributed along each engine cycle.

Choosing one of the fuel injectors 160 as the first fuel injector, it is possible to number the remaining fuel injectors according to their injection order, as the second fuel injector, the third fuel injector, and so on. Setting the crankshaft angular position at which the first fuel injector performs its injection pulses as the reference crankshaft angle (θ=0°), the application of the Fourier transform to the periodic sequence of injection pulses performed by any $l^{th}$ fuel injector may be defined as a series of harmonic components as follows:

$$Q_l(\theta) = \frac{q_l}{2\pi} + \sum_{k=1}^{\infty} \frac{q_l}{\pi} \cdot \frac{2}{k\sigma} \cdot \sin\left(\frac{k\sigma}{2}\right) \cdot \cos\left[k\theta - k\frac{2\pi}{n}(l-1)\right]$$

wherein $Q_l(\theta)$ is the dynamic fuel flow rate through the lth fuel injector in the angular domain (namely with respect to the angular position of the engine crankshaft 145), $q_l$ is the dynamic fuel quantity that flows through the lth fuel injector per injection pulse, and σ is the duration (width) of the injection pulse expressed in angular term (see FIG. 5).

Since a single injection pulse generally evolves in a maximum time of 800 μs and that its period time is longer than 30 ms (considering engine speed at 4000 rpm), a single injection pulse can be assumed to be a Dirac pulse with a flat spectral composition and harmonic components having all the same magnitude. As a matter of fact, the Dirac pulse is the limit of a real injection pulse having the width null. Accordingly, the previous equation can be simplified as follow:

$$Q_l(\theta) = \frac{q_l}{2\pi} + \sum_{k=1}^{\infty} \frac{q_l}{\pi} \cdot \cos\left[k\theta - k\frac{2\pi}{n}(l-1)\right]$$

It should be highlighted that, even if the real injection pulses could not be assumed as Dirac pulses, it would always be possible to achieve the same simplification introducing correction factors.

Considering for instance the case of a three-cylinder engine (having n=3 injectors 160), the Fourier series of the injection sequence performed by each of the fuel injector 160 will result:

$$Q_1(\theta) = \frac{q_1}{2\pi} + \sum_{k=1}^{\infty} \frac{q_1}{\pi} \cdot \cos(k\theta)$$

$$Q_2(\theta) = \frac{q_2}{2\pi} + \sum_{k=1}^{\infty} \frac{q_2}{\pi} \cdot \cos\left(k\theta - 2k\frac{\pi}{3}\right)$$

$$Q_3(\theta) = \frac{q_3}{2\pi} + \sum_{k=1}^{\infty} \frac{q_3}{\pi} \cdot \cos\left(k\theta - 4k\frac{\pi}{3}\right)$$

Considering instead a case of a four-cylinder engine (having n=4 injectors 160), the Fourier series of the injection sequence performed by each of the fuel injectors 160 will result:

$$Q_1(\theta) = \frac{q_1}{2\pi} + \sum_{k=1}^{\infty} \frac{q_1}{\pi} \cdot \cos(k\theta)$$

$$Q_2(\theta) = \frac{q_2}{2\pi} + \sum_{k=1}^{\infty} \frac{q_2}{\pi} \cdot \cos\left(k\theta - k\frac{\pi}{2}\right)$$

$$Q_3(\theta) = \frac{q_3}{2\pi} + \sum_{k=1}^{\infty} \frac{q_3}{\pi} \cdot \cos(k\theta - k\pi)$$

$$Q_4(\theta) = \frac{q_4}{2\pi} + \sum_{k=1}^{\infty} \frac{q_4}{\pi} \cdot \cos\left(k\theta - 3k\frac{\pi}{2}\right)$$

In view of the above, it is possible to define the overall fuel flow rate that exits from the fuel rail 170 through the fuel injectors 160 by the following relation:

$$Q_{tot}(\theta) = \sum_{l=1}^{n} Q_l(\theta)$$

This relation is valid for all the harmonic components and may be conveniently described with a vector representation (see FIGS. 6 and 7):

$$\vec{Q}_{tot,k} = \sum_{l=1}^{n} \vec{q}_{l,k} = \sum_{l=1}^{n} \frac{q_l}{\pi} e^{jk2\pi/n \cdot (l-1)} \quad (3)$$

wherein $\vec{Q}_{tot,k}$ is a vector representative of any generic kth harmonic order of the fuel flow rate exiting from the fuel rail 170 through all the fuel injectors 160, and $\vec{q}_{l,k}$ is a vector representative of the $k^{th}$ harmonic order of the dynamic fuel quantity that flows through the $l^{th}$ fuel injector during each injection pulse.

A peculiarity is that, for each harmonic order, there is a particular vector composition, and that vector composition of two different orders are similar when the difference between these orders is a multiple of the number n of fuel injectors 160. For instance (see FIG. 7) the vector composition of the 1st, 5th, 9th, 13th order (and so on) are equals when n=4.

For small pressure variations, as those that are caused by the injection pulses, the fuel rail pressure P is linked to the fuel flow rate $Q_{rail}$ through the fuel rail 170 by means of a relationship that is sufficiently linear and depends on the hydrodynamic capacitance $C_h$ of the fuel rail 170:

$$Q_{rail}(t) = C_h \frac{dP}{dt}$$

This formula, which is expressed in the time domain, may also be expressed in an angular domain, to make it independent from the engine speed:

$$Q_{rail}(\theta) = C_h \frac{dP}{d\theta}$$

This property is applicable to any harmonic order of the fuel rail pressure P and can be formulated in a vector form:

$$\vec{P}_k = P_k^\alpha + jP_k^\beta = -\frac{1}{k \cdot C_h} \cdot j\vec{Q}_{rail,k} \qquad (4)$$

wherein $\vec{P}_k$ is a vector representative of any $k^{th}$ harmonic order of the fuel rail pressure, $P_k^\alpha$ is the real part of the vector $\vec{P}_k$, $P_k^\beta$ is the imaginary part of the vector $\vec{P}_k$, j is the imaginary unit, and $\vec{Q}_{rail,k}$ is a vector representative of the $k^{th}$ harmonic order of the fuel flow rate through the fuel rail 170.

The hydrodynamic capacitance $C_h$ of the fuel rail 170 generally depends only on constructional and geometrical characteristics, fuel properties and temperature. For this reason, the hydrodynamic capacitance $C_h$ is a parameter that can be determined, for example by means of an experimental activity.

The total fuel flow rate $Q_{rail}$ is given by the difference between the fuel flow rate coming from the high pressure pump 180 and the fuel flow rate exiting through the fuel injectors 160.

It must however be highlighted that this propriety may not affect all the harmonic orders of the fuel flow rate $Q_{rail}$. Indeed, the high pressure pump 180 is generally driven by the engine crankshaft 145 through a mechanical transmission, so that it performs a given number of strokes per engine cycle (namely every two complete rotations of the crankshaft 145). As a consequence, the contribution of the high pressure pump 180 will be present only in the harmonic components of the fuel flow rate $Q_{rail}$ having the same periodicity:

$$\vec{Q}_{rail,k} = \vec{Q}_{HP,k} - \vec{Q}_{tot,k} \qquad (5)$$

when k is equal or multiple of the fuel pump stroke number $$\vec{Q}_{rail,k} = -\vec{Q}_{tot,k} \qquad (6)$$

when k is not equal nor multiple of the fuel pump stroke number wherein $\vec{Q}_{tot,k}$ is the vector representative of the $k^{th}$ harmonic order of the fuel flow rate exiting from the fuel rail 170 through all the fuel injectors 160, and $\vec{Q}_{HP,k}$ is a vector representative of the $k^{th}$ harmonic order of the fuel flow rate supplied by the fuel pump into the fuel rail 170.

Conventionally, a fuel injection system is defined synchronous when, for the whole engine cycle, the number of injections is multiple of the high pressure pump strokes, otherwise the fuel injection system is defined asynchronous.

Considering the equation (3) above, the vector $\vec{P}_k$ may be expressed by the following equations:

$$\vec{P}_k = P_k^\alpha + jP_k^\beta = -\frac{1}{k \cdot C_h} \cdot j\vec{Q}_{rail,k} = \qquad (7)$$

$$\frac{1}{k \cdot C_h} \cdot (Q_{HP,k}^\beta + jQ_{HP,k}^\alpha) + \frac{1}{k \cdot C_h} \cdot \sum_{l=1}^{n} j\frac{q_l}{\pi} e^{\frac{jk2\pi}{n}(l-1)}$$

or $$\vec{P}_k = P_k^\alpha + jP_k^\beta = -\frac{1}{k \cdot C_h} \cdot j\vec{Q}_{rail,k} = \frac{1}{k \cdot C_h} \cdot \sum_{l=1}^{n} j\frac{q_l}{\pi} e^{\frac{jk2\pi}{n}(l-1)} \qquad (8)$$

Wherein $\vec{Q}_{HP,k}^\alpha$ is the real part of the vector $\vec{Q}_{HP,k}$, $Q_{HP,k}^\beta$ is the imaginary part of the vector $\vec{Q}_{HP,k}$.

It must be highlighted that the harmonic distribution of the fuel pump 180 is a function of the fuel delivered $Q_{HP}$ according to the following equations:

$$Q_{HP,k}^\alpha = f_{\alpha,k}(Q_{HP}) \qquad (9)$$

$$Q_{HP,k}^\beta = f_{\beta,k}(Q_{HP}) \qquad (10)$$

Wherein $f_{\alpha,k}$ and $f_{\beta,k}$ are correlation functions that can be determined, for example with an experimental activity. As a consequence, knowing one of the harmonic of the fuel pump 180, it is possible to calculate all the others.

In conclusion, each harmonic component $\vec{P}_k$ of the fuel rail pressure provides two equations, which correlate the dynamic fuel quantities $q_l$ flowing through the fuel injectors 160 respectively with the real part $P_k^\alpha$ and the imaginary part $P_k^\beta$ of the harmonic component vector of the fuel rail pressure.

Among all these equations it is possible to select a number of equations equal to the number n of fuel injectors. Having selected the most convenient set of equations, the ECU 450 may use the Fourier analysis of the fuel rail pressure signal to calculate the harmonic components of the fuel rail pressure, replace the calculated harmonic components in the selected set of equations, and finally resolve the system of these equations to calculate the dynamic fuel quantity $q_l$ flowing through each fuel injector 160.

By way of example, we can consider the case of the case of a 3-cylinder engine with a 3-stroke high pressure pump 180 (synchronous fuel injection system). In this case, the lowest harmonic components of the pump 180 are present on the $3^{rd}$ order. Some of the equations available from the relations (7) and (8) are thus the following:

$$1^{st} \text{ order} \begin{cases} \frac{q_1}{\pi} - \frac{1}{2\pi}q_2 - \frac{1}{2\pi}q_3 = C_h \cdot P_1^\beta \\ \frac{\sqrt{3}}{2\pi}q_2 - \frac{\sqrt{3}}{2\pi}q_3 = -C_h \cdot P_1^\alpha \end{cases}$$

$$2^{nd} \text{ order} \begin{cases} \frac{q_1}{\pi} - \frac{1}{2\pi}q_2 - \frac{1}{2\pi}q_3 = 2C_h \cdot P_2^\beta \\ -\frac{\sqrt{3}}{2\pi}q_2 + \frac{\sqrt{3}}{2\pi}q_3 = -2C_h \cdot P_2^\alpha \end{cases}$$

$$3^{rd} \text{ order} \begin{cases} \frac{q_1}{\pi} + \frac{q_2}{\pi} + \frac{q_3}{\pi} = 3C_h \cdot P_3^\beta + Q_{HP,3}^\alpha \\ 0 = -3C_h \cdot P_3^\alpha + Q_{HP,3}^\beta \end{cases}$$

Among these available equations, it is possible to select for example the following system of three equations:

$$\frac{q_1}{\pi} - \frac{1}{2\pi}q_2 - \frac{1}{2\pi}q_3 = C_h \cdot P_1^\beta$$

$$\frac{\sqrt{3}}{2\pi}q_2 - \frac{\sqrt{3}}{2\pi}q_3 = -C_h \cdot P_1^\alpha$$

$$\frac{q_1}{\pi} + \frac{q_2}{\pi} + \frac{q_3}{\pi} = 3C_h \cdot P_3^\beta + Q_{HP,3}^\alpha$$

The second equations of the third order $0 = -3C_h \cdot P_3^\alpha + Q_{HP,3}^\beta$ can be used, together with the equations (9) and (10) to calculate the term $Q_{HP,3}^\alpha$:

$$Q_{HP,3}^\beta = 3C_h \cdot P_3^\alpha \rightarrow Q_{HP} = f_{\beta,3}^{-1}(Q_{HP,3}^\beta) \rightarrow Q_{HP,3}^\alpha = f_{\alpha,3}(Q_{HP})$$

Thus, the system of the selected equations is:

$$\begin{bmatrix} \frac{1}{\pi} & -\frac{1}{2\pi} & -\frac{1}{2\pi} \\ 0 & \frac{\sqrt{3}}{2\pi} & -\frac{\sqrt{3}}{2\pi} \\ \frac{1}{\pi} & \frac{1}{\pi} & \frac{1}{\pi} \end{bmatrix} \cdot \begin{bmatrix} q_1 \\ q_2 \\ q_3 \end{bmatrix} = \begin{bmatrix} C_h \cdot P_1^\beta \\ -C_h \cdot P_1^\alpha \\ 3 C_h \cdot P_3^\beta + Q_{HP,3}^\alpha \end{bmatrix}$$

With the Fourier analysis of the fuel rail pressure signal in real time, it is possible to determine the unknown parameters $P_1^\beta$, $P_1^\alpha$ and $P_3^\beta$, so that, solving the three-equation system above, the ECU 450 is advantageously able to calculate the dynamic fuel quantities flowing through each of the injectors q1, q2 and q3.

In case of a 3-cylinder engine with a 2-stroke high pressure pump 180 (asynchronous fuel injection system), the lowest harmonic components of the pump 180 are present on the $2^{nd}$ order. Some of the equations available from the relations (7) and (8) are thus the following:

$1^{st}$ order $\begin{cases} \frac{q_1}{\pi} - \frac{1}{2\pi} q_2 - \frac{1}{2\pi} q_3 = C_h \cdot P_1^\beta \\ \frac{\sqrt{3}}{2\pi} q_2 - \frac{\sqrt{3}}{2\pi} q_3 = -C_h \cdot P_1^\alpha \end{cases}$ $2^{nd}$ order $\begin{cases} \frac{q_1}{\pi} - \frac{1}{2\pi} q_2 - \frac{1}{2\pi} q_3 = 2C_h \cdot P_2^\beta + Q_{HP,2}^\beta \\ -\frac{\sqrt{3}}{2\pi} q_2 + \frac{\sqrt{3}}{2\pi} q_3 = -2C_h \cdot P_2^\alpha + Q_{HP,2}^\beta \end{cases}$ $3^{rd}$ order $\begin{cases} \frac{q_1}{\pi} - \frac{1}{2\pi} q_2 - \frac{1}{2\pi} q_3 = 2C_h \cdot P_2^\beta \\ 0 = -3C_h \cdot P_2^\alpha \end{cases}$ Among these available equations, it is possible to select for example the following system of three equations:

$\frac{q_1}{\pi} - \frac{1}{2\pi} q_2 - \frac{1}{2\pi} q_3 = C_h \cdot P_1^\beta$ $\frac{\sqrt{3}}{2\pi} q_2 - \frac{\sqrt{3}}{2\pi} q_3 = -C_h \cdot P_1^\alpha$ $\frac{q_1}{\pi} + \frac{q_2}{\pi} + \frac{q_3}{\pi} = 3C_h \cdot P_3^\beta$ Wherein the contribution of the fuel pump 180 is absent. The system of the selected equations is:

$$\begin{bmatrix} \frac{1}{\pi} & -\frac{1}{2\pi} & -\frac{1}{2\pi} \\ 0 & \frac{\sqrt{3}}{2\pi} & -\frac{\sqrt{3}}{2\pi} \\ \frac{1}{\pi} & \frac{1}{\pi} & \frac{1}{\pi} \end{bmatrix} \cdot \begin{bmatrix} q_1 \\ q_2 \\ q_3 \end{bmatrix} = \begin{bmatrix} C_h \cdot P_1^\beta \\ -C_h \cdot P_1^\alpha \\ 3 C_h \cdot P_3^\beta \end{bmatrix}$$

With the Fourier analysis of the fuel rail pressure signal in real time, it is possible to determine the unknown parameters $P_1^\beta$, $P_1^\alpha$ and $P_3^\beta$, so that solving the three-equation system above, the ECU 450 is advantageously able to calculate the dynamic fuel quantities flowing through each of the injectors q1, q2 and q3.

Another example is the case of a 4-cylinder engine with a 4-stroke high pressure pump 180 (synchronous fuel injection system). In this case, the lowest harmonic components of the pump 180 are present on the $4^{th}$ order. Some of the equations available from the relations (7) and (8) are thus the following:

$1^{st}$ order $\begin{cases} \frac{q_1}{\pi} - \frac{q_3}{\pi} = C_h \cdot P_1^\beta \\ \frac{q_2}{\pi} - \frac{q_4}{\pi} = -C_h \cdot P_1^\alpha \end{cases}$ $2^{nd}$ order $\begin{cases} \frac{q_1}{\pi} - \frac{q_2}{\pi} + \frac{q_3}{\pi} - \frac{q_4}{\pi} = 2C_h \cdot P_2^\beta \\ 0 = -2C_h \cdot P_2^\alpha \end{cases}$ $3^{rd}$ order $\begin{cases} \frac{q_1}{\pi} - \frac{q_3}{\pi} = 3C_h \cdot P_3^\beta \\ -\frac{q_2}{\pi} + \frac{q_4}{\pi} = -3C_h \cdot P_3^\alpha \end{cases}$ $4^{th}$ order $\begin{cases} \frac{q_1}{\pi} + \frac{q_2}{\pi} + \frac{q_3}{\pi} + \frac{q_4}{\pi} = 4C_h \cdot P_4^\beta + Q_{HP,4}^\alpha \\ 0 = -4C_h \cdot P_4^\alpha + Q_{HP,4}^\beta \end{cases}$ Among these available equations, it is possible to select for example the following system of four equations:

$\frac{q_1}{\pi} - \frac{q_3}{\pi} = C_h \cdot P_1^\beta$ $\frac{q_2}{\pi} - \frac{q_4}{\pi} = -C_h \cdot P_1^\alpha$ $\frac{q_1}{\pi} - \frac{q_2}{\pi} + \frac{q_3}{\pi} - \frac{q_4}{\pi} = 2C_h \cdot P_2^\beta$ $\frac{q_1}{\pi} + \frac{q_2}{\pi} + \frac{q_3}{\pi} + \frac{q_4}{\pi} = 4C_h \cdot P_4^\beta + Q_{HP,4}^\alpha$ The second equations of the fourth order $0=-4C_h \cdot P_4^\alpha + Q_{HP,4}^\beta$ can be used, together with the equations (9) and (10) to calculate the term $Q_{HP,4}^\alpha$:

$Q_{HP,4}^\beta = 4C_h \cdot P_4^\alpha \rightarrow Q_{HP} = f_{\beta,4}^{-1}(Q_{HP,4}^\beta) \rightarrow Q_{HP,4}^\alpha = f_{\alpha,3}(Q_{HP})$ The system of the selected equations is:

$$\begin{bmatrix} \frac{1}{\pi} & 0 & -\frac{1}{\pi} & 0 \\ 0 & \frac{1}{\pi} & 0 & -\frac{1}{\pi} \\ \frac{1}{\pi} & -\frac{1}{\pi} & \frac{1}{\pi} & -\frac{1}{\pi} \\ \frac{1}{\pi} & \frac{1}{\pi} & \frac{1}{\pi} & \frac{1}{\pi} \end{bmatrix} \cdot \begin{bmatrix} q_1 \\ q_2 \\ q_3 \\ q_4 \end{bmatrix} = \begin{bmatrix} C_h \cdot P_1^\beta \\ -C_h \cdot P_1^\alpha \\ 2C_h \cdot P_2^\beta \\ 4C_h \cdot P_4^\beta + Q_{HP,4}^\alpha \end{bmatrix}$$

With the Fourier analysis of the fuel rail pressure signal in real time, it is possible to determine the unknown parameters $P_1^\beta$, $P_1^\alpha$, $P_2^\beta$ and $P_4^\beta$ so that solving the four-equation system above, the ECU 450 is advantageously able to calculate the dynamic fuel quantities flowing through each of the injectors q1, q2, q3 and q4.

In case of a 4-cylinder engine with a 3-stroke high pressure pump 180 (asynchronous fuel injection system), the lowest harmonic components of the pump 180 are present on the $3^{rd}$ order. Some of the equations available from the relations (7) and (8) are thus the following:

$1^{st}$ order $\begin{cases} \dfrac{q_1}{\pi} - \dfrac{q_3}{\pi} = C_h \cdot P_1^\beta \\ \dfrac{q_2}{\pi} - \dfrac{q_4}{\pi} = -C_h \cdot P_1^\alpha \end{cases}$ $2^{nd}$ order $\begin{cases} \dfrac{q_1}{\pi} - \dfrac{q_2}{\pi} + \dfrac{q_3}{\pi} - \dfrac{q_4}{\pi} = 2C_h \cdot P_2^\beta \\ 0 = -2C_h \cdot P_2^\alpha \end{cases}$ $3^{rd}$ order $\begin{cases} \dfrac{q_1}{\pi} - \dfrac{q_3}{\pi} = 3C_h \cdot P_3^\beta + Q_{HP,3}^\alpha \\ -\dfrac{q_2}{\pi} + \dfrac{q_4}{\pi} = -3C_h \cdot P_3^\beta + Q_{HP,3}^\beta \end{cases}$ $4^{th}$ order $\begin{cases} \dfrac{q_1}{\pi} + \dfrac{q_2}{\pi} + \dfrac{q_3}{\pi} + \dfrac{q_4}{\pi} = 4C_h \cdot P_4^\beta \\ 0 = -4C_h \cdot P_4^\alpha \end{cases}$ Among these available equations, it is possible to select for example to following system of four equations:

$$\dfrac{q_1}{\pi} - \dfrac{q_3}{\pi} = C_h \cdot P_1^\beta$$

$$\dfrac{q_2}{\pi} - \dfrac{q_4}{\pi} = -C_h \cdot P_1^\alpha$$

$$\dfrac{q_1}{\pi} - \dfrac{q_2}{\pi} + \dfrac{q_3}{\pi} - \dfrac{q_4}{\pi} = 2C_h \cdot P_2^\beta$$

$$\dfrac{q_1}{\pi} + \dfrac{q_2}{\pi} + \dfrac{q_3}{\pi} + \dfrac{q_4}{\pi} = 4C_h \cdot P_4^\beta$$

Wherein the contribution of the fuel pump 180 is absent.
The system of the selected equations is:

$$\begin{bmatrix} \dfrac{1}{\pi} & 0 & -\dfrac{1}{\pi} & 0 \\ 0 & \dfrac{1}{\pi} & 0 & -\dfrac{1}{\pi} \\ \dfrac{1}{\pi} & -\dfrac{1}{\pi} & \dfrac{1}{\pi} & -\dfrac{1}{\pi} \\ \dfrac{1}{\pi} & \dfrac{1}{\pi} & \dfrac{1}{\pi} & \dfrac{1}{\pi} \end{bmatrix} \cdot \begin{bmatrix} q_1 \\ q_2 \\ q_3 \\ q_4 \end{bmatrix} = \begin{bmatrix} C_h \cdot P_1^\beta \\ -C_h \cdot P_1^\alpha \\ 2C_h \cdot P_2^\beta \\ 4C_h \cdot P_4^\beta \end{bmatrix}$$

With the Fourier analysis of the fuel rail pressure signal in real time, it is possible to determine the unknown parameters $P_1^\beta$, $P_1^\alpha$, $P_2^\beta$ and $P_4^\beta$ so that solving the four-equation system above, the ECU 450 is advantageously able to calculate the dynamic fuel quantities flowing through each of the injectors q1, q2, q3 and q4.

In all the cases, the ECU 450 may finally use the equation (1) to calculate the fuel quantity actually injected by each fuel injector 160 as a function of the fuel rail pressure P and of the dynamic fuel quantity $q_l$.

This detecting strategy may be practically performed when the internal combustion engine is operating under cut-off conditions. By way of example, it can be used as a test aimed to check the efficiency of the fuel injectors, or as part of a closed loop control of the fuel injected quantity, for example in order to adjust the energizing time such as to inject exactly a desired quantity of fuel. This embodiment of the detecting strategy also represents a theoretical background, on which other practical embodiments of the detecting strategy may be based.

Figure 8:
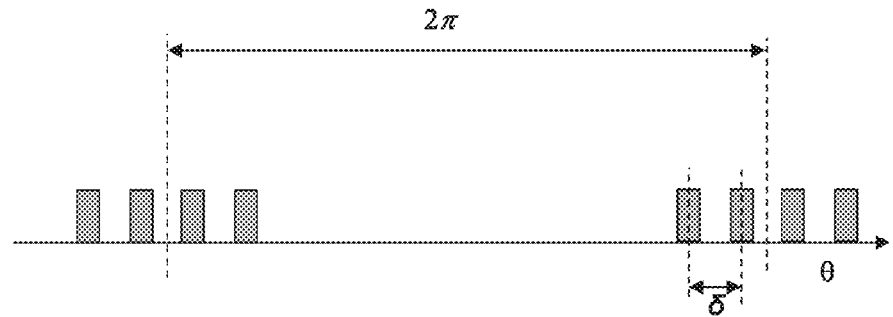
FIG. 8 is a diagram that represents a sequence of periodic injection pattern performed by a fuel injector in the angular domain.

In this regard, another embodiment of the detecting strategy may provide for the ECU 450 to operate all the fuel injectors 160 of the internal combustion engine 110 such that each of them performs an injection pattern including a plurality of equal injection pulses mutually separated by the same angular shift (see FIG. 8). As a matter of fact, each one of the fuel injectors 160 repeats the injection pattern with an angular periodicity of $2\pi$ (referred to the crankshaft rotation), and the injection patterns performed by all the fuel injectors 160 result symmetrically distributed along each engine cycle.

Figure 9:
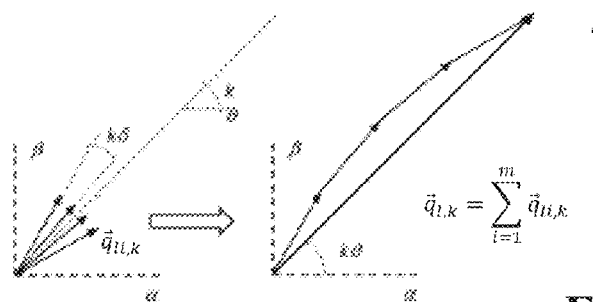
FIG. 9 is a vector representation of a harmonic order k of the injection pulses of each injection pattern of FIG. 8.

Combining the effect of the injection pulses as shown in FIG. 9, each harmonic order of the dynamic fuel quantity that globally flow through each of the fuel injectors 160 per any injection pattern can be represented as a single vector:

$$\vec{q}_{l,k} = \sum_{i=1}^{m} \vec{q}_{li,k} = \dfrac{q_{ls}}{\pi} \sum_{i=1}^{m} e^{jk\left[2\pi/n \cdot (l-1) - \frac{(2i-m-1)}{2}\delta\right]} =$$

$$\dfrac{q_{ls}}{\pi} e^{jk 2\pi/n \cdot (l-1)} \sum_{i=1}^{m} e^{-jk\frac{(2i-m-1)}{2}\delta} = \dfrac{q_{ls}}{\pi} e^{jk 2\pi/n \cdot (l-1)} \sum_{i=1}^{m} \cos\left(k\dfrac{(2i-m-1)}{2}\delta\right)$$

wherein $\vec{q}_{l,k}$ is a vector representative of the $k^{th}$ harmonic order of the dynamic fuel quantity that flows through the lth fuel injector during each injection pattern, $\vec{q}_{li,k}$ is a vector representative of the $k^{th}$ harmonic order of the dynamic fuel quantity that flows through the $l^{th}$ fuel injector during the $i^{th}$ injection pulse of the injection pattern, $q_{ls}$ is the dynamic fuel quantity flowing through the $l^{th}$ fuel injector during each injection pulse, m is the number of injection pulses in the injection pattern and $\delta$ is the angular shift from each injection pulse to another.

This formulation shows that each injection pattern behaves like a single injection whose magnitude varies according the order k considered, so that it is still possible to define the overall fuel flow rate that exits from the fuel rail 170 through the fuel injectors 160 by an equation such the (3) above:

$$\vec{Q}_{tot,k} = \sum_{l=1}^{n} \vec{q}_{l,k} = \sum_{l=1}^{n} \dfrac{q_{ls}}{\pi} e^{jk 2\pi/n \cdot (l-1)} \sum_{i=1}^{m} \cos\left(k\dfrac{(2i-m-1)}{2}\delta\right) \quad (11)$$

Wherein $\vec{Q}_{tot,k}$ is a vector representative of the $k^{th}$ harmonic order of the fuel flow rate that exits the fuel rail 170 through all the fuel injectors.

The vector $\vec{Q}_{tot,k}$ provided by the equation (11) may then be applied to the equations (4), (5) and (6) above, thereby making available n equations that correlate the dynamic fuel quantities $q_{ls}$ flowing through the fuel injectors 160 respectively with the real part $P_k^\alpha$ and the imaginary part $P_k^\beta$ of the harmonic component vector of the fuel rail pressure. As a matter of fact, these equations may be the same described above, but with a different known term.

By way of example, considering the case of the 3-cylinder engine with a 2-stroke fuel pump, and assuming to have an injection pattern of four injection pulses per cylinder, the equation system may be as follows:

$$\begin{bmatrix} \frac{1}{\pi} & -\frac{1}{2\pi} & -\frac{1}{2\pi} \\ 0 & \frac{\sqrt{3}}{2\pi} & -\frac{\sqrt{3}}{2\pi} \\ \frac{1}{\pi} & \frac{1}{\pi} & \frac{1}{\pi} \end{bmatrix} \cdot \begin{bmatrix} q_{1s} \\ q_{2s} \\ q_{3s} \end{bmatrix} = \begin{bmatrix} C_h \cdot P_1^\beta / \sum_{i=1}^{4} \cos\left(k\frac{(2i-5)}{2}\delta\right) \\ -C_h \cdot P_1^\alpha / \sum_{i=1}^{4} \cos\left(k\frac{(2i-5)}{2}\delta\right) \\ 3C_h \cdot P_3^\beta / \sum_{i=1}^{4} \cos\left(k\frac{(2i-5)}{2}\delta\right) \end{bmatrix}$$

Under the same hypothesis, it is possible to also build-up the equation system for the case of a 4-cylinder engine:

$$\begin{bmatrix} \frac{1}{\pi} & 0 & -\frac{1}{\pi} & 0 \\ 0 & \frac{1}{\pi} & 0 & -\frac{1}{\pi} \\ \frac{1}{\pi} & -\frac{1}{\pi} & \frac{1}{\pi} & -\frac{1}{\pi} \\ \frac{1}{\pi} & \frac{1}{\pi} & \frac{1}{\pi} & \frac{1}{\pi} \end{bmatrix} \cdot \begin{bmatrix} q_{1s} \\ q_{2s} \\ q_{3s} \\ q_{4s} \end{bmatrix} = \begin{bmatrix} C_h \cdot P_1^\beta / \sum_{i=1}^{4} \cos\left(k\frac{(2i-5)}{2}\delta\right) \\ -C_h \cdot P_1^\alpha / \sum_{i=1}^{4} \cos\left(k\frac{(2i-5)}{2}\delta\right) \\ 2C_h \cdot P_2^\beta / \sum_{i=1}^{4} \cos\left(k\frac{(2i-5)}{2}\delta\right) \\ 4C_h \cdot P_4^\beta / \sum_{i=1}^{4} \cos\left(k\frac{(2i-5)}{2}\delta\right) \end{bmatrix}$$

This second embodiment of the present disclosure may be performed when the internal combustion engine 110 is running under cut-off condition, and may be used in a closed loop control of the fuel injected quantity, for example in order to determine the energizing time actually needed to inject exactly a desired quantity of fuel. In particular, this embodiment of the present disclosure may be useful when the fuel quantities $q_{ls}$ belongs to the so called small injections. Indeed, repeating these small injection pulses more than once per engine cycle, it is advantageously possible to enhance their effect of the fuel rail pressure, which therefore may be measured more easily.

Figure 10:
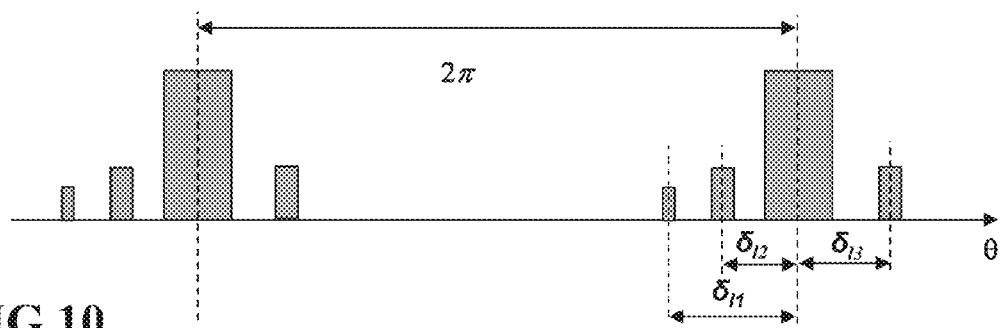
FIG. 10 is a diagram that represents another sequence of periodic injection pattern performed by a fuel injector in the angular domain.
Figure 11:
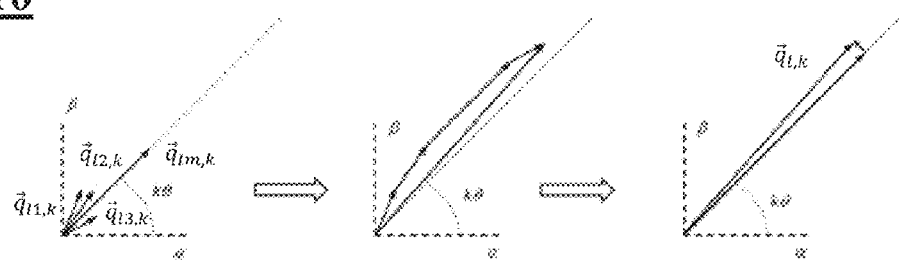
FIG. 11 is a vector representation of a harmonic order k of the injection pulses of each injection pattern of FIG. 10.

According to another embodiment of the present disclosure, the detecting strategy may provide for the ECU 450 to operate all the fuel injectors 160 of the internal combustion engine 110 such that each of them performs a injection pattern including a main injection pulse and one or more auxiliary injection pulses, wherein the auxiliary injection pulses are smaller than the main injection pulse (see FIG. 10). Also in this case, each one of the fuel injectors 160 repeats the injection pattern with an angular periodicity of $2\pi$ (referred to the crankshaft rotation), and the injection pattern performed by all the fuel injectors 160 result symmetrically distributed along each engine cycle.

Combining the effect of the injection pulses, each harmonic order of the dynamic fuel quantity that globally flow through each of the fuel injectors 160 per any injection pattern can be represented as a single vector (considering the angle of the main injection pulse is chosen as reference angle):

$$\vec{q}_{l,k} = \vec{q}_{lm,k} + \sum_{r=1}^{x} \vec{q}_{lr,k} = q_{lm}e^{jk2\pi/n\cdot(l-1)} + \sum_{r=1}^{x} q_{lr}e^{jk(2\pi/n\cdot(l-1)+\delta_{lr})}$$

wherein $\vec{q}_{l,k}$ is a vector representative of the kth harmonic order of the dynamic fuel quantity that flows through the $l^{th}$ fuel injector during each injection pattern, $\vec{q}_{lm,k}$ is a vector representative of the $k^{th}$ harmonic order of the dynamic fuel quantity that flows through the $l^{th}$ fuel injector during the main injection pulse of the injection pattern, $\vec{q}_{lr,k}$ is a vector representative of the $k^{th}$ harmonic order of the dynamic fuel quantity that flows through the $l^{th}$ fuel injector during the $r^{th}$ injection pulse of the injection pattern, $q_{lm}$ is the dynamic fuel quantity flowing through the $l^{th}$ fuel injector during the main injection pulse, x is the number of auxiliary injection pulses in the injection pattern, $q_{lr}$ is the dynamic fuel quantity flowing through the $l^{th}$ fuel injector during the $r^{th}$ auxiliary injection pulse, and $\delta_{lr}$ is the angular shift from the $r^{th}$ auxiliary injection pulse and the main injection pulse performed by the $l^{th}$ fuel injector.

This relationship can be formulated using a component aligned with the position θ and another orthogonal to it:

$$\vec{q}_{l,k} = \left[q_{lm} + \sum_{r=1}^{x} q_{lr}\cos(k\delta_{lr})\right]e^{jk2\pi/n\cdot(l-1)} - j\left[\sum_{r=1}^{x} q_{lr}\sin(k\delta_{lr})\right]e^{jk2\pi/n\cdot(l-1)}$$

This formulation shows that each injection pattern behaves like a single injection whose magnitude varies according the order k considered, so that it is still possible to define the overall fuel flow rate that exits from the fuel rail 170 through the fuel injectors 160 by an equation such the (3) above:

$$\vec{Q}_{tot,k} = \sum_{l=1}^{n} \vec{q}_{l,k} = \sum_{l=1}^{n} \left[q_{lm} + \sum_{r=1}^{x} q_{lr}\cos(k\delta_{lr})\right]e^{jk2\pi/n\cdot(l-1)} - j\left[\sum_{r=1}^{x} q_{lr}\sin(k\delta_{lr})\right]e^{jk2\pi/n\cdot(l-1)} \quad (12)$$

Wherein $\vec{Q}_{tot,k}$ is a vector representative of the $k^{th}$ harmonic order of the fuel flow rate that exits the fuel rail through all the fuel injectors.

In this case, the dynamic fuel quantities $q_{lr}$ flowing through the fuel injector during the auxiliary injection pulses may be considered known, as they may be measured for example with one of the previous embodiments of the present disclosure.

As a consequence, the vector $\vec{Q}_{tot,k}$ provided by the equation (12) may then be applied to the equations (4), (5) and (6) above, thereby making available n equations that correlate the dynamic fuel quantities $q_{lm}$ flowing through the fuel injectors 160 during the main injection respectively with the real part $P_k^\alpha$ and the imaginary part $P_k^\beta$ of the harmonic component vector of the fuel rail pressure. As a matter of fact, these equations may be the same described above, but with a different known term.

By way of example, we can consider the case of the 3-cylinder engine with a 3-stroke pump, and assume (as shown in FIG. 10) to have an injection pattern of four injection pulses, namely a main injection, a pilot injection, a pre-injection and an after injection. In such a case, some of the available equations may be:

$$1^{st} \text{ order} \begin{cases} \frac{q_{1m}}{\pi} - \frac{1}{2\pi}q_{2m} - \frac{1}{2\pi}q_{3m} = C_h \cdot P_1^\beta \\ \frac{\sqrt{3}}{2\pi}q_{2m} - \frac{\sqrt{3}}{2\pi}q_{3m} = -C_h \cdot P_1^\alpha \end{cases}$$

-continued $$2^{nd} \text{ order} \begin{cases} \dfrac{q_{1m}}{\pi} - \dfrac{1}{2\pi}q_{2m} - \dfrac{1}{2\pi}q_{3m} = 2C_h \cdot P_2^\beta \\ -\dfrac{\sqrt{3}}{2\pi}q_{2m} + \dfrac{\sqrt{3}}{2\pi}q_{3m} = -2C_h \cdot P_2^\alpha \end{cases}$$

$$3^{rd} \text{ order} \begin{cases} \dfrac{q_{1m}}{\pi} + \dfrac{q_{2m}}{\pi} + \dfrac{q_{3m}}{\pi} = 3C_h \cdot P_3^\beta + Q_{HP,3}^\alpha - 3\sum_{r=1}^{3} q_{lr}\cos(3\delta_{lr}) \\ 0 = -3C_h \cdot P_3^\alpha + Q_{HP,3}^\beta + 3\sum_{r=1}^{3} q_{lr}\sin(3\delta_{lr}) \end{cases}$$

Therefore, the equation system may be chosen as:

$$\begin{bmatrix} \dfrac{1}{\pi} & -\dfrac{1}{2\pi} & -\dfrac{1}{2\pi} \\ 0 & \dfrac{\sqrt{3}}{2\pi} & -\dfrac{\sqrt{3}}{2\pi} \\ \dfrac{1}{\pi} & \dfrac{1}{\pi} & -\dfrac{1}{\pi} \end{bmatrix} \begin{bmatrix} q_{1m} \\ q_{2m} \\ q_{3m} \end{bmatrix} = \begin{bmatrix} C_h \cdot P_1^\beta \\ -C_h \cdot P_1^\alpha \\ 3C_h \cdot P_3^\beta + Q_{HP,3}^\alpha - 3\sum_{r=1}^{3} q_{lr}\cos(3\delta_{lr}) \end{bmatrix}$$

Under the same hypothesis, it is possible to build-up also the equation system for the case of a 4-cylinder engine with a 4-stroke pump:

$$1^{st} \text{ order} \begin{cases} \dfrac{q_{1m}}{\pi} - \dfrac{q_{3m}}{\pi} = C_h \cdot P_1^\beta \\ \dfrac{q_2}{\pi} - \dfrac{q_4}{\pi} = -C_h \cdot P_1^\alpha \end{cases}$$

$$2^{nd} \text{ order} \begin{cases} \dfrac{q_{1m}}{\pi} - \dfrac{q_{2m}}{\pi} + \dfrac{q_{3m}}{\pi} - \dfrac{q_{4m}}{\pi} = 2C_h \cdot P_2^\beta \\ 0 = -2C_h \cdot P_2^\alpha \end{cases}$$

$$3^{rd} \text{ order} \begin{cases} \dfrac{q_{1m}}{\pi} - \dfrac{q_{3m}}{\pi} = 3C_h \cdot P_3^\beta \\ -\dfrac{q_{2m}}{\pi} + \dfrac{q_{4m}}{\pi} = -3C_h \cdot P_3^\alpha \end{cases}$$

$4^{th}$ order $$\begin{cases} \dfrac{q_{1m}}{\pi} + \dfrac{q_{2m}}{\pi} + \dfrac{q_{3m}}{\pi} + \dfrac{q_{4m}}{\pi} = 4C_h \cdot P_4^\beta + Q_{HP,4}^\alpha - 4\sum_{r=1}^{3} q_{lr}\cos(4\delta_{lr}) \\ 0 = -4C_h \cdot P_4^\alpha + Q_{HP,4}^\beta + 4\sum_{r=1}^{3} q_{lr}\sin(4\delta_{lr}) \end{cases}$$

As a consequence, the equation system may be chosen as:

$$\begin{bmatrix} \dfrac{1}{\pi} & 0 & -\dfrac{1}{\pi} & 0 \\ 0 & \dfrac{1}{\pi} & 0 & -\dfrac{1}{\pi} \\ \dfrac{1}{\pi} & -\dfrac{1}{\pi} & \dfrac{1}{\pi} & -\dfrac{1}{\pi} \\ \dfrac{1}{\pi} & \dfrac{1}{\pi} & \dfrac{1}{\pi} & \dfrac{1}{\pi} \end{bmatrix} \cdot \begin{bmatrix} q_{1m} \\ q_{2m} \\ q_{3m} \\ q_{4m} \end{bmatrix} = \begin{bmatrix} C_h \cdot P_1^\beta \\ -C_h \cdot P_1^\alpha \\ 2C_h \cdot P_2^\beta \\ 4C_h \cdot P_4^\beta + Q_{HP,4}^\alpha - 4\sum_{r=1}^{3} q_{lr}\cos(4\delta_{lr}) \end{bmatrix}$$

This third embodiment of the present disclosure may be performed during the normal operation of the internal combustion engine 110, in order to monitor the fuel quantities that are actually injected by the main injections. This fuel injected quantities may particularly be used in a closed loop control of the fuel injected quantity, for example in order to adjust the energizing time of the main injections such as to inject exactly a desired quantity of fuel.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A method of operating an internal combustion engine having a fuel rail in fluid communication with the fuel pump and a plurality of fuel injectors in fluid communication with the fuel rail, wherein the method comprises:
   operating each fuel injector to perform a predetermined injection pattern per engine cycle;
   sampling a fuel rail pressure signal representative of a fuel pressure within the fuel rail during the operation of the fuel injectors;
   performing a Fourier analysis of the fuel rail pressure signal to determine at least one harmonic components thereof;
   calculating a dynamic fuel quantity that flows through a fuel injector during an injection pulse of the injection pattern using the following relation:

$$\vec{P}_k = P_k^\alpha + jP_k^\beta = -\dfrac{1}{k \cdot C_h} \cdot j \vec{Q}_{rail,k}$$

wherein:
   $\vec{P}_k$ is a vector representative of the $k^{th}$ harmonic order of the fuel rail pressure signal;
   $P_k^\alpha$ is the real part of the vector $\vec{P}_k$;
   $C_h$ is the hydrodynamic capacitance of the fuel rail;
   j is the imaginary unit; and
   $\vec{Q}_{rail,k}$ is a vector representative of the $k^{th}$ harmonic of the fuel flow rate through the fuel rail;
   determining a calculated fuel quantity actually injected by the fuel injector during the injection pulse as a function of the dynamic fuel quantity; and
   adjusting an energizing time actually needed for each of the plurality of fuel injectors to inject a desired quantity of fuel with each of the plurality of the fuel injectors based on the calculate fuel quantity actually injected.

2. The method according to claim 1 further comprising using the calculated fuel quantity actually injected in a closed loop control of the fuel injected quantity when the internal combustion engine is running under cut-off condition.

3. The method according to claim 1 further comprising using the calculated fuel quantity actually injected is used in a closed loop control of the fuel injected quantity when the internal combustion engine is running under a normal operating condition.

4. The method according to claim 1, further comprising sampling the fuel rail pressure signal in a crankshaft angular domain.

5. The method according to claim 1, further comprising sampling the fuel rail pressure signal with a sampling frequency that is higher than the frequency of the predetermined injection patterns.

6. A method according to claim 1 wherein the vector $\vec{Q}_{rail,k}$ is expressed by the following equation:

$$\vec{Q}_{rail,k} = -\vec{Q}_{tot,k}$$

Wherein $\vec{Q}_{tot,k}$ is a vector representative of the $k^{th}$ harmonic order of the fuel flow rate that exits the fuel rail through all the fuel injectors.

7. The method according to claim 6, wherein the predetermined injection pattern performed by the fuel injectors is composed by a single injection pulse, and wherein the vector $\vec{Q}_{tot,k}$ is expressed by the following equation:

$$\vec{Q}_{tot,k} = \sum_{l=1}^{n} \vec{q}_{l,k} = \sum_{l=1}^{n} \frac{q_l}{\pi} e^{jk2\pi/n \cdot (l-1)}$$

Wherein:
n is the number of fuel injectors;
$\vec{q}_{l,k}$ is a vector representative of the $k^{th}$ harmonic order of the dynamic fuel quantity that flows through the $l^{th}$ fuel injector during the injection pulse; and
$q_l$ is the dynamic fuel quantity flowing through the $l^{th}$ fuel injector during the injection pulse.

8. The method according to claim 6, wherein the injection pattern performed by the fuel injectors is composed by a plurality of equal injection pulses and wherein the vector $\vec{Q}_{tot,k}$ is expressed by the following equation:

$$\vec{Q}_{tot,k} = \sum_{l=1}^{n} \vec{q}_{l,k} = \sum_{l=1}^{n} \frac{q_l}{\pi} e^{jk2\pi/n \cdot (l-1)} \sum_{i=1}^{m} \cos\left(k\frac{(2i-m-1)}{2}\delta\right)$$

Wherein:
n is the number of fuel injectors;
$\vec{q}_{l,k}$ is a vector representative of the $k^{th}$ harmonic order of the dynamic fuel quantity that flows through the $l^{th}$ fuel injector during each injection pattern;
$q_{ls}$ is the dynamic fuel quantity flowing through the $l^{th}$ fuel injector during each injection pulse; and
m is the number of injection pulses in the injection pattern and $\delta$ is the angular shift from each injection pulse to another.

9. The method according to claim 6, wherein the injection pattern performed by the fuel injectors is composed by a main injection pulse and at least one auxiliary injection pulse, wherein the at least one auxiliary injection pulse is smaller than the main injection pulse, and wherein the vector $\vec{Q}_{tot,k}$ is expressed by the following equation:

$$\vec{Q}_{tot,k} = \sum_{l=1}^{n} \vec{q}_{l,k} =$$

$$\sum_{l=1}^{n} \left[q_{lm} + \sum_{r=1}^{x} q_{lr}\cos(k\delta_{lr})\right] e^{jk2\pi/n \cdot (l-1)} - j\left[\sum_{r=1}^{x} q_{lr}\sin(k\delta_{lr})\right] e^{jk2\pi/n \cdot (l-1)}$$

Wherein:
n is the number of fuel injectors;
$\vec{q}_{l,k}$ is a vector representative of the $k^{th}$ harmonic order of the dynamic fuel quantity that flows through the $l^{th}$ fuel injector during each injection pattern;
$q_{lm}$ is the dynamic fuel quantity flowing through the $l^{th}$ fuel injector during the main injection pulse;
x is the number of auxiliary injection pulses in the injection pattern;
$q_{lr}$ is the dynamic fuel quantity flowing through the $l^{th}$ fuel injector during the $r^{th}$ auxiliary injection pulse; and
$\delta_{lr}$ is the angular shift from the $r^{th}$ auxiliary injection pulse and the main injection pulse performed by the $l^{th}$ fuel injector.

10. The method according to claim 1 wherein the vector $\vec{Q}_{rail,k}$ is expressed by the following equation:

$$\vec{Q}_{rail,k} = \vec{Q}_{HP,k} - \vec{Q}_{tot,k}$$

Wherein:
$\vec{Q}_{tot,k}$ is a vector representative of the $k^{th}$ harmonic order of the fuel flow rate that exits the fuel rail through all the fuel injectors; and
$\vec{Q}_{HP,k}$ is a vector representative of the $k^{th}$ harmonic order of the fuel flow rate supplied by the fuel pump into the fuel rail.

11. The method according to claim 10, wherein the predetermined injection pattern performed by the fuel injectors is composed by a single injection pulse, and wherein the vector $\vec{Q}_{tot,k}$ is expressed by the following equation:

$$\vec{Q}_{tot,k} = \sum_{l=1}^{n} \vec{q}_{l,k} = \sum_{l=1}^{n} \frac{q_l}{\pi} e^{jk2\pi/n \cdot (l-1)}$$

Wherein:
n is the number of fuel injectors;
$\vec{q}_{l,k}$ is a vector representative of the $k^{th}$ harmonic order of the dynamic fuel quantity that flows through the $l^{th}$ fuel injector during the injection pulse; and
$q_l$ is the dynamic fuel quantity flowing through the $l^{th}$ fuel injector during the injection pulse.

12. The method according to claim 10, wherein the injection pattern performed by the fuel injectors is composed by a plurality of equal injection pulses and wherein the vector $\vec{Q}_{tot,k}$ is expressed by the following equation:

$$\vec{Q}_{tot,k} = \sum_{l=1}^{n} \vec{q}_{l,k} = \sum_{l=1}^{n} \frac{q_l}{\pi} e^{jk2\pi/n \cdot (l-1)} \sum_{i=1}^{m} \cos\left(k\frac{(2i-m-1)}{2}\delta\right)$$

Wherein:
n is the number of fuel injectors;
$\vec{q}_{l,k}$ is a vector representative of the $k^{th}$ harmonic order of the dynamic fuel quantity that flows through the $l^{th}$ fuel injector during each injection pattern;
$q_{ls}$ is the dynamic fuel quantity flowing through the $l^{th}$ fuel injector during each injection pulse; and
m is the number of injection pulses in the injection pattern and $\delta$ is the angular shift from each injection pulse to another.

13. The method according to claim 10, wherein the injection pattern performed by the fuel injectors is composed by a main injection pulse and at least one auxiliary injection pulse, wherein the at least one auxiliary injection pulse is smaller than the main injection pulse, and wherein the vector $\vec{Q}_{tot,k}$ is expressed by the following equation:

$$\vec{Q}_{tot,k} = \sum_{l=1}^{n} \vec{q}_{l,k} =$$

$$\sum_{l=1}^{n} \left[ q_{lm} + \sum_{r=1}^{x} q_{lr}\cos(k\delta_{lr}) \right] e^{jk2\pi/n\cdot(l-1)} - j\left[ \sum_{r=1}^{x} q_{lr}\sin(k\delta_{lr}) \right] e^{jk2\pi/n\cdot(l-1)}$$

Wherein:

n is the number of fuel injectors;

$\vec{q}_{l,k}$ is a vector representative of the $k^{th}$ harmonic order of the dynamic fuel quantity that flows through the $l^{th}$ fuel injector during each injection pattern;

$q_{lm}$ is the dynamic fuel quantity flowing through the $l^{th}$ fuel injector during the main injection pulse;

x is the number of auxiliary injection pulses in the injection pattern;

$q_{lr}$ is the dynamic fuel quantity flowing through the $l^{th}$ fuel injector during the $r^{th}$ auxiliary injection pulse; and $\delta_{lr}$ is the angular shift from the $r^{th}$ auxiliary injection pulse and the main injection pulse performed by the $l^{th}$ fuel injector.

14. A computer program comprising a computer code suitable for performing the method according to claim 1, wherein the computer code is stored on a non-transitory computer readable medium.

15. A computer program product comprising a processor executing the computer program of claim 14 is stored.

16. A control apparatus for an internal combustion engine, comprising an Electronic Control Unit, a data carrier associated to the Electronic Control Unit and a computer program according to claim 15 stored in the data carrier.

17. A fuel injection system comprising: a fuel pump; a fuel rail in fluid communication with the pump; a plurality of fuel injectors in fluid communication with the fuel rail; and an electronic control unit programmed to:

operate each of the plurality of fuel injectors to perform a predetermined injection pattern per engine cycle;

sample a fuel rail pressure signal representative of a fuel pressure within the fuel rail during the operation of the fuel injectors;

perform a Fourier analysis of the fuel rail pressure signal to determine at least one harmonic components thereof;

calculate a dynamic fuel quantity that flows through a fuel injector during an injection pulse of the injection pattern using following relation:

$$\vec{P}_k = P_k^\alpha + jP_k^\beta = -\frac{1}{k \cdot C_h} \cdot j \vec{Q}_{rail,k}$$

wherein:

$\vec{P}_k$ is a vector representative of the $k^{th}$ harmonic order of the fuel rail pressure signal;

$P_k^\alpha$ is the real part of the vector $\vec{P}_k$;

$P_k^\beta$ is the imaginary part of the vector $\vec{P}_k$;

$C_h$ is the hydrodynamic capacitance of the fuel rail;

j is the imaginary unit; and $\vec{Q}_{rail,k}$ is a vector representative of the $k^{th}$ harmonic order of the fuel flow rate through the fuel rail; calculate a fuel quantity actually injected by the fuel injector during the injection pulse as a function of the dynamic fuel quantity; and adjust an energizing time actually needed for each of the plurality of fuel injectors to iject a desired quantity of fuel with each of the plurality of fuel injectors based on the calculated fuel quantity actually injected.

18. The fuel injection system according to claim 17 wherein the electronic control unit is further configured to use the calculated fuel quantity actually injected is used in a closed loop control of the fuel injected quantity when the internal combustion engine is running under cut-off condition.

19. The fuel injection system according to claim 17 wherein the electronic control unit is further configured to use the calculated fuel quantity actually injected is used in a closed loop control of the fuel injected quantity when the internal combustion engine is running under a normal operating condition.

* * * * *